(12) United States Patent
Koch, III et al.

(10) Patent No.: US 7,403,689 B2
(45) Date of Patent: Jul. 22, 2008

(54) ACTIVE PHOTONIC BAND-GAP OPTICAL FIBER

(75) Inventors: Karl W. Koch, III, Elmira, NY (US); James A. West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 52 days.

(21) Appl. No.: 10/716,892

(22) Filed: Nov. 19, 2003

(65) Prior Publication Data

US 2005/0105867 A1   May 19, 2005

(51) Int. Cl.
*G02B 6/032* (2006.01)

(52) U.S. Cl. ............................ 385/125; 385/133

(58) Field of Classification Search ............ 385/125, 385/133
See application file for complete search history.

(56) References Cited

U.S. PATENT DOCUMENTS

| | | | |
|---|---|---|---|
| 5,577,801 A | 11/1996 | Glockl | 297/201 |
| 5,907,652 A | 5/1999 | DiGiovanni et al. | 385/125 |
| 6,445,494 B1 | 9/2002 | Nilsson et al. | 359/341.1 |
| 6,459,846 B1 | 10/2002 | Choi et al. | 385/142 |
| 6,480,659 B1 | 11/2002 | Patlakh et al. | 385/125 |
| 6,496,634 B1 | 12/2002 | Levenson | 385/125 |
| 6,539,155 B1 | 3/2003 | Broeng et al. | 385/125 |
| 6,542,682 B2 | 4/2003 | Cotteverte et al. | 385/125 |
| 6,563,981 B2 | 5/2003 | Weisberg et al. | 385/28 |
| 6,600,597 B2 * | 7/2003 | Beeson | 359/342 |
| 6,985,661 B1 * | 1/2006 | Russell et al. | 385/125 |
| 2002/0003827 A1 | 1/2002 | Genack et al. | 372/51 |
| 2002/0131737 A1 | 9/2002 | Broeng et al. | 385/123 |
| 2003/0049003 A1 | 3/2003 | Ahmad et al. | 385/123 |

(Continued)

FOREIGN PATENT DOCUMENTS

WO   WO94/15389   7/1994

(Continued)

OTHER PUBLICATIONS

"Conditions of single guided mode in two-dimensional triangular photonic crystal slab waveguides", Ryu, et al Journal of Applied Physics vol. 88, No. 9 Nov. 1, 2000 pp. 4941-4946.

(Continued)

*Primary Examiner*—Michelle R. Connelly-Cushwa
*Assistant Examiner*—Jerry T. Rahll
(74) *Attorney, Agent, or Firm*—Juliana Agon; Gregory V. Bean

(57) ABSTRACT

A plurality of active gain material (93) is disposed in an active interface portion (44) of a dielectric band-gap cladding confinement region (22) adjacent to a dielectric core (12) of a photonic band-gap crystal fiber (20), wherein during operation, the plurality of active gain material (93) absorbs the pump energy and stores the pump energy as a potential energy storage for stimulation by EM energy in a second guided mode at a second frequency in a second range of frequencies for overlapping with the first guided mode of the core (12) such that the surface defined by an interface between the photonic band-gap cladding (22) and the dielectric core (12) that supports at least one surface mode propagating at that interface (44) overlaps the active interface portion of the dielectric cladding confinement region and a state associated with the dielectric core (12).

26 Claims, 18 Drawing Sheets

U.S. PATENT DOCUMENTS

| | | | |
|---|---|---|---|
| 2003/0095578 A1 | 5/2003 | Kopp et al. | 372/6 |
| 2003/0117699 A1 | 6/2003 | Maroney et al. | 359/342 |
| 2003/0161599 A1 | 8/2003 | Broderick et al. | 385/125 |
| 2003/0174986 A1* | 9/2003 | Forbes et al. | 385/125 |
| 2003/0231846 A1* | 12/2003 | Fajardo et al. | 385/125 |
| 2004/0175085 A1* | 9/2004 | Forbes et al. | 385/125 |

FOREIGN PATENT DOCUMENTS

| | | |
|---|---|---|
| WO | WO02/14946 A1 | 2/2002 |
| WO | WO02/082136 A1 | 10/2002 |
| WO | WO02/084350 A1 | 10/2002 |
| WO | WO02/101429 A1 | 12/2002 |
| WO | WO03/038486 A2 | 8/2003 |

OTHER PUBLICATIONS

"Cladding pumped Ytterbium-doped fiber laser with holey inner and outer cladding", Furusawa, et al Optics Express Vo. 9, No. 13 Dec. 17, 2001, pp. 714-720.

"Full 2-D photonic bandgaps in silica/air structures", Birks, et al Electronics Letters Oct. 26, 1995, vol. 31, No. 22, pp. 1941-1943.

"Single-Mode Photonic Band Gap Guidance of Light in Air", Cregan, et al Science vol. 285 Sep. 3, 1999, pp. 1537-1539.

"Guided and defect modes in periodic dielectric waveguides", Fan, et al, J. Opt. Soc. Am. B, vol. 12, No. 7, Jul. 1995 pp. 1267-1272.

* cited by examiner

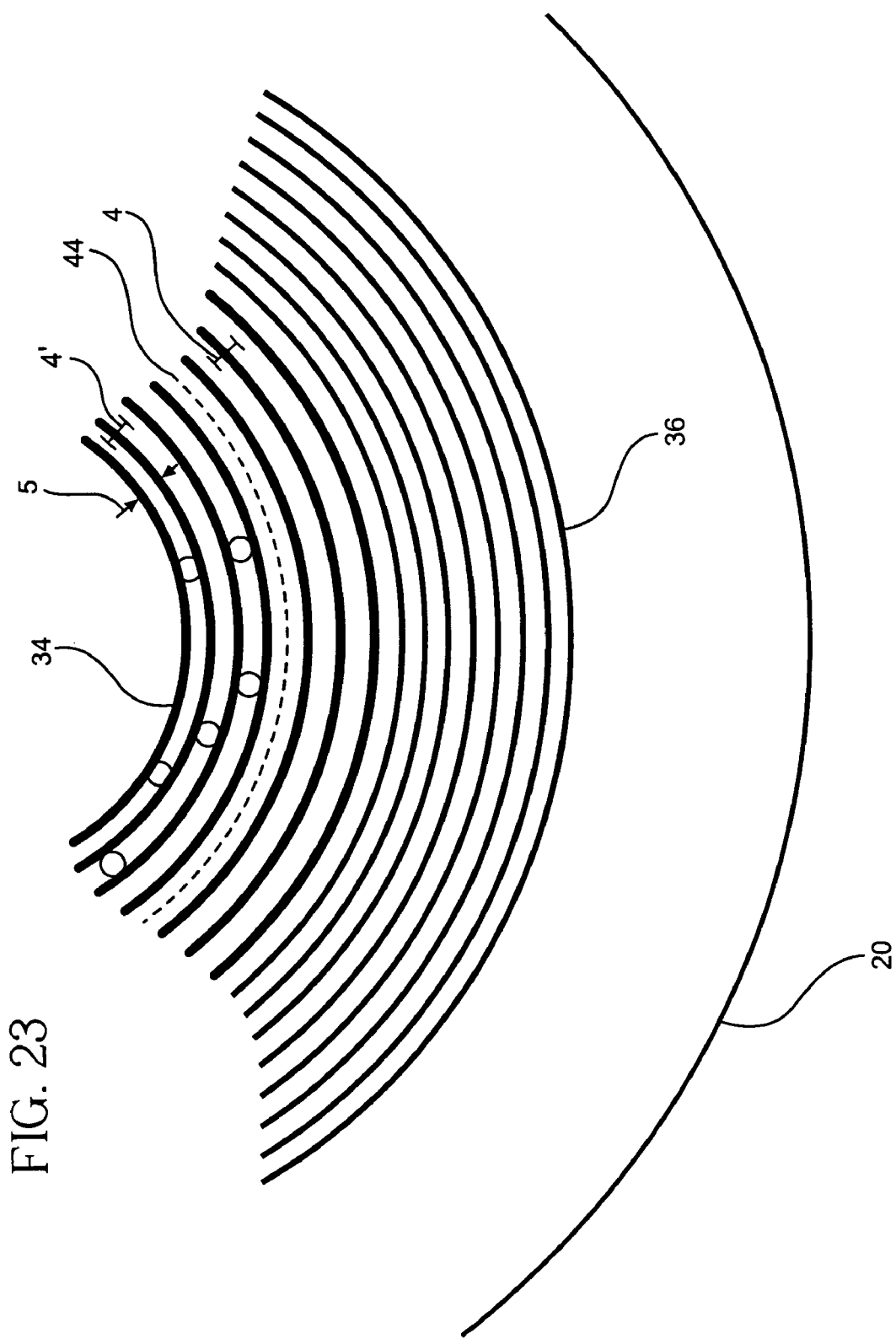

ACTIVE PHOTONIC BAND-GAP OPTICAL FIBER

Parts of this invention were made with Government support under Agreement No. MDA972-02-3-004 awarded by DARPA. The Government may have certain rights in some of the claims of the invention.

BACKGROUND OF THE INVENTION

1. Field of the Invention

The present invention relates generally to optical waveguides, and more specifically to active microstructures, such as photonic band-gap optical waveguides, for use in applications such as fiber lasers and amplifiers.

2. Technical Background

Optical fibers formed completely from glass materials have been in commercial use for more than two decades. Although such optical fibers have represented a leap forward in the field of telecommunications, work on alternative optical fiber designs continues. One promising type of alternative optical fiber is a microstructure optical fiber, which includes holes or voids running longitudinally along the fiber axis and is sometimes called a "holey" fiber. The holes generally contain air or an inert gas, but may also contain other materials or vacuum.

Microstructure optical fibers may be designed to have a wide variety of properties, and may be used in a wide variety of applications. For example, microstructure optical fibers having a solid glass core and a plurality of holes disposed in the cladding region around the core have been constructed. The arrangement, spacing or pitch, and sizes of the holes may be designed to yield microstructure optical fibers with dispersions ranging anywhere from large negative values to large positive values. Such fibers may be useful, for example, in dispersion compensation. Solid-core microstructure optical fibers may also be designed to be single mode over a wide range of wavelengths. Solid-core microstructure optical fibers generally guide light by a total internal reflection mechanism; the low index of the holes can be thought of as lowering the effective index of the cladding region in which they are disposed.

One especially interesting type of microstructure optical fiber is the photonic band-gap fiber or crystal. Photonic band-gap fibers guide light by a mechanism that is fundamentally different from the total internal reflection (TIR) mechanism. Photonic band-gap fibers have a photonic band-gap structure formed in the cladding of the fiber. The photonic band-gap structure may be, for example, a periodic array of holes having a spacing on the order of the wavelength of light. The photonic band-gap structure has a range of frequencies and propagation constants, known as the band-gap, for which light is forbidden from propagating in the photonic band-gap structure. To form an optical waveguide (or more generally, a structure that guides electromagnetic (EM) energy), a defect is formed in the photonic band-gap crystal or fiber. The core of the fiber is thus formed by the defect in the photonic band-gap structure cladding. For example, the defect may be a hole of a substantially different size and/or shape than the holes of the photonic band-gap structure. Alternatively, the defect may be a solid structure embedded within the photonic band-gap structure. Light introduced into the core will have a propagation constant determined by the frequency of the light and the structure of the core. Light propagating in the core of the fiber having a frequency and propagation constant within the band-gap of the photonic band-gap structure will not propagate in the photonic band-gap cladding, and will therefore be confined to the core. A photonic band-gap fiber may have a core that is formed from a hole larger than those of the surrounding photonic band-gap structure; in such a hollow-core fiber, the light may be guided within the core hole. The defect is a discontinuity in the lattice structure and can be a change in pitch of the lattice, the replacement of a portion of the lattice by a material of different refractive index, or the removal of a portion of the photonic band-gap crystal material. The shape and size of the defect is selected to produce or support a mode of light propagation having a wavelength that is within the band-gap of the photonic crystal. The walls of the defect are thus made of a material, a photonic band-gap crystal, which will not propagate the mode produced by the defect. In analogy with the total internal reflection optical waveguide, the defect acts as the waveguide core and the photonic band-gap crystal acts as the cladding. However, the mechanism of the waveguide allows the core to have a very low refractive index thus realizing the benefits of low attenuation and low non-linearity.

There has been significant interest in the potential of photonic band-gap guidance in optical fibers. While the theory of guidance in these fibers has been described, actual fabrication and demonstration of optical properties of photonic band-gap fibers has been relatively rare. The photonic band-gap fibers that have been demonstrated have suffered from high loss (or high attenuation); the lowest losses reported have been on the order of 10 dB/km. In order to be of significant practical interest as transport fibers for telecommunications, photonic band-gap fibers must have much lower losses.

Fiber lasers represent a highly efficient means of converting low-coherence pump light into coherent signal light. Fiber lasers have excellent surface-area-to-volume ratio for cooling, are typically flexible for convenient deployment, and are lightweight and inexpensive. These attributes make fiber lasers extremely attractive for a number of applications.

Scaling fiber lasers to higher powers involves increased pumping levels and interaction lengths. However, nonlinear optical effects and surface damage eventually limit the ability to scale to higher powers.

Previously, fiber profile designs with increased effective areas have been used in an attempt to reduce the nonlinear optical effects. The maximum effective area, however, is typically limited by bend loss; larger effective area fibers usually show increased bend loss. Anti-reflection coatings and polished fiber end faces have been used to reduce the surface damage at the fiber-air interface. These attempts allow for increased operational power, but are still limited to approximately 1000 W of average power. Scaling to higher power requires a mechanism similar to double-clad configurations of conventional fiber lasers in order to efficiently convert multimode pump energy into single-mode fiber-laser energy.

Because of the low non-linearity benefits provided by a photonic band-gap crystal waveguide, there is a need to identify fiber profile design structures that produce modes that will enable efficient conversion of pump energy into single-mode fiber-laser energy.

The uses of the photonic band-gap crystal waveguide include those that involve the delivery of high electromagnetic power levels such as in devices for excising material or welding material.

There is a also a particular need to incorporate the low non-linearity of photonic band-gap crystal in a waveguide, such as a fiber, to scale fiber laser operating powers beyond current designs, which can be limited by nonlinear interactions. One example of nonlinear interaction is Stimulated Brillouin scattering or SBS. SBS is a nonlinear optical process that occurs between an optical field and a material density wave. The optical field and density waves in the material interact through the known process of electrostriction. The coefficient describing the strength of this interaction is described by the electrostrictive constant. In standard solid-core optical fibers an incident field can be reflected from the fiber and frequency shifted as a result of the SBS effect. In many applications, such as fiber lasers and fiber amplifiers, SBS can be a detrimental effect. A number of approaches have been developed to circumvent the influence of the SBS process; most involve reducing the intensity through increased effective area or spectrally broadening the optical fields.

The threshold power for the SBS process depends on the spectral width of the pump wave and the effective area of the optical field. In continuous-wave pump fields it can be as low as 1 mW. Thus, the amplification or generation of narrowband continuous-wave optical radiation is difficult to obtain in optical fiber amplifiers or optical fiber lasers due to the limiting effects of SBS.

In hollow-core photonic band-gap fiber (PBGF) the optical field is guided in a void of the fiber cross section. This void could be filled with air, some other gas, a liquid, or could be evacuated to support a vacuum region. Since the electrostrictive constant describing the SBS interaction is proportional to the number density of the material and the number density of gases is about three orders of magnitude smaller than that of glass, the hollow core of a photonic band-gap fiber will have a nonlinear response about three orders of magnitude smaller than a solid-core glass optical fiber.

In addition, the amplification and generation of pulsed optical fields is limited by the nonlinear processes that take place in the amplifier or laser. Since the nonlinear coefficients that describe the various nonlinear processes are proportional to the number density of the core material in an optical fiber amplifier or oscillator, a hollow-core PBGF is ideally suited to suppress these nonlinear effects.

Therefore, there is a need for an optically active hollow-core PBGF to enable various uses, such as amplifying and generating narrowband optical fields or pulsed optical fields with greatly reduced nonlinear impairment.

SUMMARY OF THE INVENTION

One aspect of the present invention relates to a photonic crystal waveguide having a signal and pump overlap portion doped with active materials that overlap guided modes of the waveguide wherein the void-filling fraction of the cladding is in the range of 0.45 to 0.98 to enable air guidance in the air core.

Another aspect of the present invention relates to a photonic band-gap crystal waveguide having a ratio of defect dimension ($R_d$) to pitch ($\Lambda$) in a range from about 1.12 to 1.20 for configuring the band-gap region to provide an overlap for the surface mode radiated at the band-gap region for enhancing the core mode radiated from the defect state at the pump wavelength and suppressing the surface mode at the signal wavelength.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention and together with the description serve to explain the principles and operation of the invention.

BRIEF DESCRIPTION OF THE DRAWINGS

FIG. 23 is an enlarged section of the cross-sectional schematic view of a double-photonic-band-gap Bragg fiber showing a perturbation to the innermost cladding layers that will support a surface mode at the core-cladding interface.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. One aspect of the present invention relates to a photonic band-gap fiber (PBGF), even though the present invention also cover waveguides that are planar or of other shapes.

Figure 1:
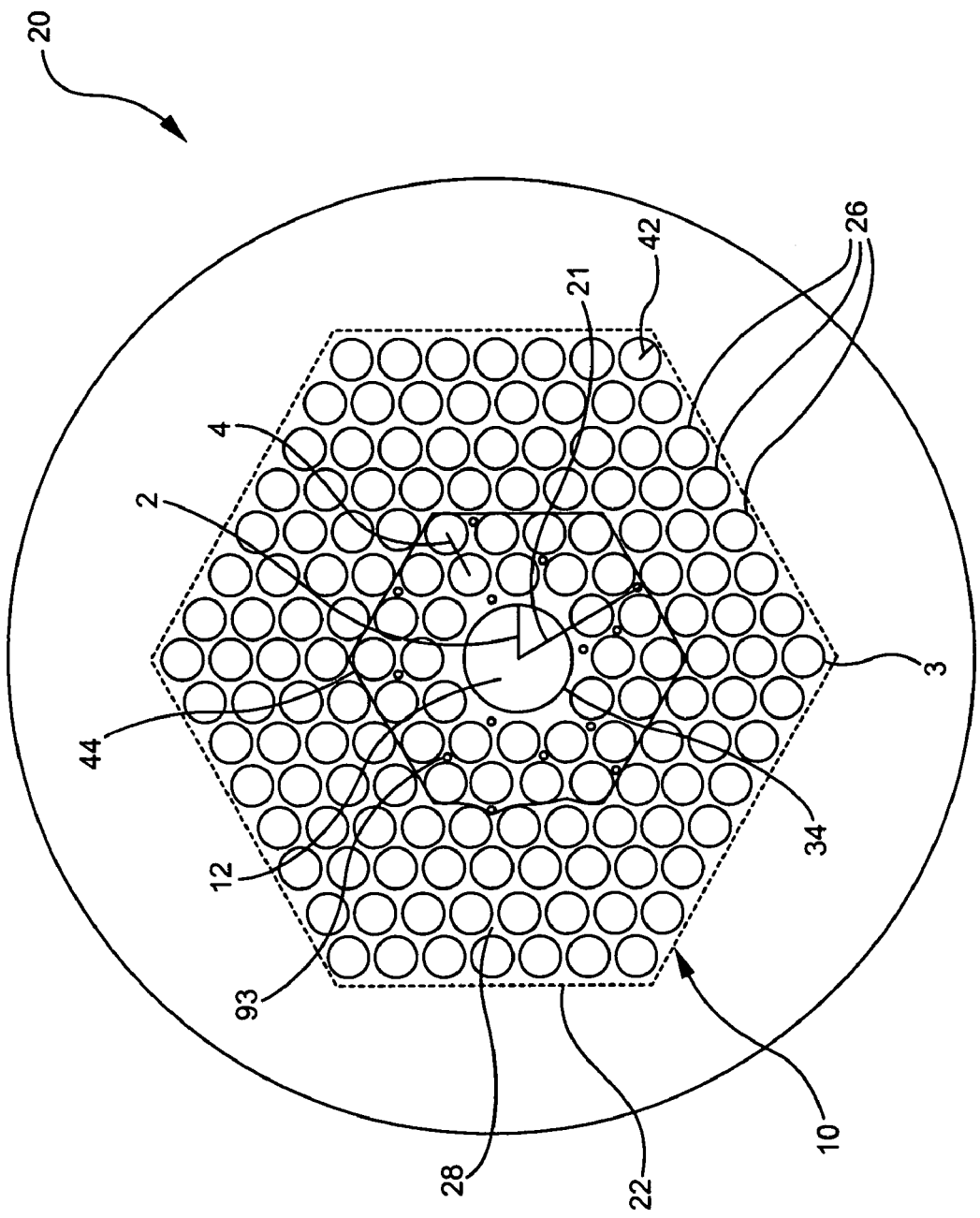
FIG. 1 is a cross-sectional schematic view of an actively doped single photonic band-gap crystal fiber, having an isotropic circular cross section, in accordance to the teachings of the present invention.

Referring to FIG. 1, a cross-sectional schematic view of an embodiment of a photonic band-gap fiber (PBGF) or photonic band-gap crystal waveguide according to the present invention is shown. Photonic band-gap fiber 20 includes a cladding region 22 formed from a photonic band-gap structure or crystal 10. In the Example of FIG. 1, the photonic band-gap structure 10 includes a periodic array of holes 26 formed in the matrix material or webbing 28 of cladding region 22. Holes 26 of FIG. 1 are schematically depicted as being circular in cross-section but can of be any shape; the skilled artisan will recognize that the holes may have a substantially different cross-sectional shape (e.g. square, triangular, hexagonal, polygonal, elliptical, rectangular or irregular, such as an approximate hexagonal shape) to form voids, apertures, channels or other holes in cylinders or other structures.

Photonic band-gap fiber 20 also includes core region 12, which is surrounded by photonic band-gap structure 10 of cladding region 22. Even though shown as centrally aligned, the core regions 12 and the photonic band-gap region 22 do not necessarily have the same common center point in other skewed alignments. In the example of FIG. 1, core region 12 is formed as a hole or an aperture in matrix material 28. The hole defining core region 12 is different from, but preferably much larger than, the holes 26 of photonic band-gap structure; as such, core region 12 acts as a defect in photonic band-gap structure 10. However, in other cases, the core defect can be smaller than the holes of the photonic band-gap structure.

As with the band-gap or cladding holes 26, the core or defect 12 may also be of any shape. For example, the laser guide via the defect can be made symmetric or anisotropic for unpolarized or polarized operation, respectively. Core region 12 may be composed of an inert gas such as nitrogen or argon, air, or a liquid. Core region 12 may also be a region of substantial vacuum (e.g. less than about 20 mm Hg).

The photonic band-gap crystal or first band-gap region, serving as an inner-cladding region 22 is illustrated as a lattice or web of light-colored cylinders 3 in the cropped representations of FIGS. 5-6 and 7-9 to focus more on the ratios between the radius of the core defect $R_d$ and the pitch $\Lambda$ of the apertures in the inner-cladding region for interacting the core and surface modes, as a function of the air-filling fraction, to be discussed later. Holes, voids, or apertures 26 having the radius $r_{cl}$, are embedded in a material represented by the dark areas surrounding each of the cylinders. The photonic band-gap crystal defect or core 12 is illustrated as having a circular cross section of radius 2. As in the case of the photonic band-gap crystal features, the defect cross section can have a general shape, including a circular-ended-cross shape of FIG. 2, and provide desired performance in accordance with the photonic band-gap crystal waveguide teachings of the invention. The length of defect or core 12 extends into the photonic band-gap crystal or fiber in a direction of an optical axis 0 perpendicular to the circular cross section, as seen in FIG. 3. The boundary between the defect 12 and the photonic band-gap crystal or cladding region 22 is a circle in this case and the numerical value associated with the boundary is radius 2 as seen in FIG. 1.

Referring back to FIG. 1 and in accordance with the teachings of the present invention, the perimeter of the core 12, preferably filled with low refractive index material, such as air, vacuum or a gas, is surrounded or bounded by a series of hollow Yb-doped glass cylinders or channels in a pump and signal overlap portion, such as an interface portion or annulus 44 of the inner cladding 22 or the core itself in an active gaseous embodiment such as active molecules, for example hydrogen in a core of carbon dioxide for extracting gain by Raman action in a Raman amplifier.

The outer boundary of the pump and signal overlap portion extending from the center point of the defect 12 defines the pump and signal overlap portion and has a radius 21 from the center point of the defect 12. For an actively doped gaseous core example, where the pump and signal overlap portion is the defect 12 itself, then the outer boundary of the pump and signal overlap portion has a radius 21 that is the same radius 2 of the defect 12. In this case, the radius to the boundary of the signal and pump overlap portion 21 is equal to the radius of the defect 12 with a factor of 1.0.

In order to obtain a 10% signal pump overlap, the radius to the boundary of the signal and pump overlap portion 21 is greater than the radius of the defect 12 by a factor of 1.1. Allowing for other design factors, the range for the radius to the boundary of the signal and pump overlap portion 21 is preferably greater than the radius of the defect 12 by a factor of 1.5. In general, the range for the radius to the boundary of the signal and pump overlap portion 21 is preferably greater than the radius of the defect 12 by a factor of 1.1-3.0.

For a particular desired fiber mode profile where the active periodic structure of the inner cladding 22 has a first pitch ($\Lambda$), a lattice hole size 42 having a radius $r_{cl}$ (assuming a circular hole), a ratio of $r_{cl}/\Lambda$ is preferred in a range about $0.35 \leq r_{cl}/\Lambda \leq 0.5$ which is related to a particular air-fill fraction or volume of 0.44-0.91. Contrary to conventional beliefs that an infinite matrix is needed to provide a band-gap, note that the inner cladding 22 is supported by only four rows of cylinders 3 as the matrixed material, and more precisely three rows of full circular cylinders 3, and one row of partially cut cylinders that need not be limited to a circular design but can be of any other shape.

Figure 21:
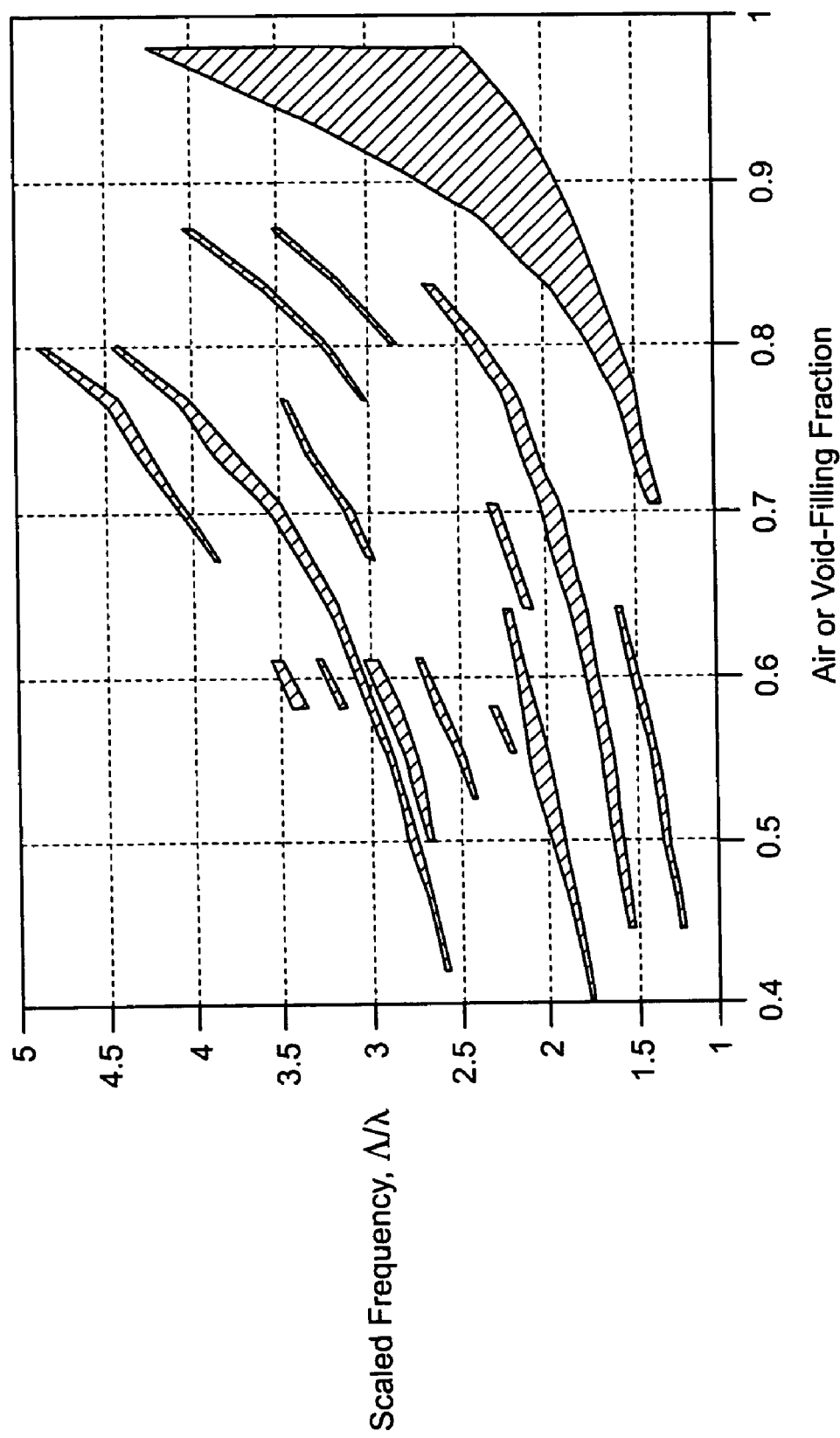
FIG. 21 is a graph of band-gaps as a function of scaled frequency and air or void-filling fraction for use with the active fiber design of FIGS. 16 and 17, according to the present invention.

Referring to FIG. 21, a graph of scaled frequency as a function of air or void filling fraction shows the optimum range of air filling fraction. The air-filling fraction, f on the horizontal axis is related to the circular hole-size ($r_{cl}$) of the lattice as $$f = \frac{\pi}{2\sqrt{3}}\left(\frac{d}{\Lambda}\right)^2 = \frac{2\pi}{\sqrt{3}}\left(\frac{r_{cl}}{\Lambda}\right)^2.$$

Hence, the inner cladding having the pitch ($\Lambda$) between photonic band-gap aperture size $r_{cl}$ such that a ratio of $r_{cl}/\Lambda$ is in an optimum range about $0.35 \leq r_{cl}/\Lambda \leq 0.5$ results for about an air filling fraction from 0.44 to 0.91. The upper bound of 0.91 is the air filling fraction when the lattice can no longer support circular voids. As the voids become less rounded, the air-filling fraction can approach the limit of 1.

In the non-gaseous embodiment, a first or two hexagonal ring(s) or other shaped periphery forms the interface portion 44. The cylinders can be doped with other optically-active ions 93, such as other transitional or rare-earth metals. The Yb-doped glass region 44 is pumped with a conventional semiconductor laser for optical pumping for converting the pumping energy at a shorter wavelength into a signal energy at a longer wavelength, such as from 980 nm to 1480 nm.

Light guided in air results in enormous benefits to the optical waveguide properties. The nonlinear refractive index, $n_2$, which describes a material's nonlinear optical response, is proportional to the number density, N of the material. In the process of exchanging a solid glass core for a gaseous core, the number density decreases by three orders of magnitude. This results in a corresponding decrease of the nonlinear response of an air-core optical waveguide. Thus, an air-core PBGF with 1 GW/cm$^2$ of optical intensity will experience the same level of nonlinear effect as a conventional waveguide with 1 MW/cm$^2$ of optical intensity. This provides advantages to high-power fiber lasers.

Another benefit of guiding light in air is the absence or near elimination of Fresnel reflections from the end faces of the fiber. Since the optical field has an effective refractive index close to that of air, there is no discontinuity in the refractive index at the fiber end face. The only consequence of the field leaving the fiber is that it will undergo diffraction and begin to spread. Fresnel reflection of the air-core mode is nearly zero. Again this has obvious application to high-power fiber lasers.

However, there is currently no known photonic band-gap fiber laser known prior to this present invention. Photonic band-gap fiber offers a means to scale fiber laser operating powers beyond current designs, which can be limited by nonlinear interactions. However, scaling to higher power requires a mechanism similar to double-clad configurations of conventional fiber lasers in order to efficiently convert multimode pump energy into single-mode fiber-laser energy. This invention teaches a fiber profile design that will enable efficient conversion of pump energy into single-mode fiber-laser energy. This approach would provide the advantage of reduced nonlinearity for the laser core region. The reduction could be as large as 1000×, resulting in the ability to handle 1000× more intensity than conventional approaches.

A single-band-gap fiber can function as a fiber laser without a second band-gap and can be used in applications such as amplifier or lasers. The optional second band-gap adds advantages over a single band-gap. For example, the double band-gap allows conversion of spatially incoherent pump energy into spatially coherent signal energy. Moreover, the second band-gap offers an avenue for scaling to higher powers.

Figure 2:
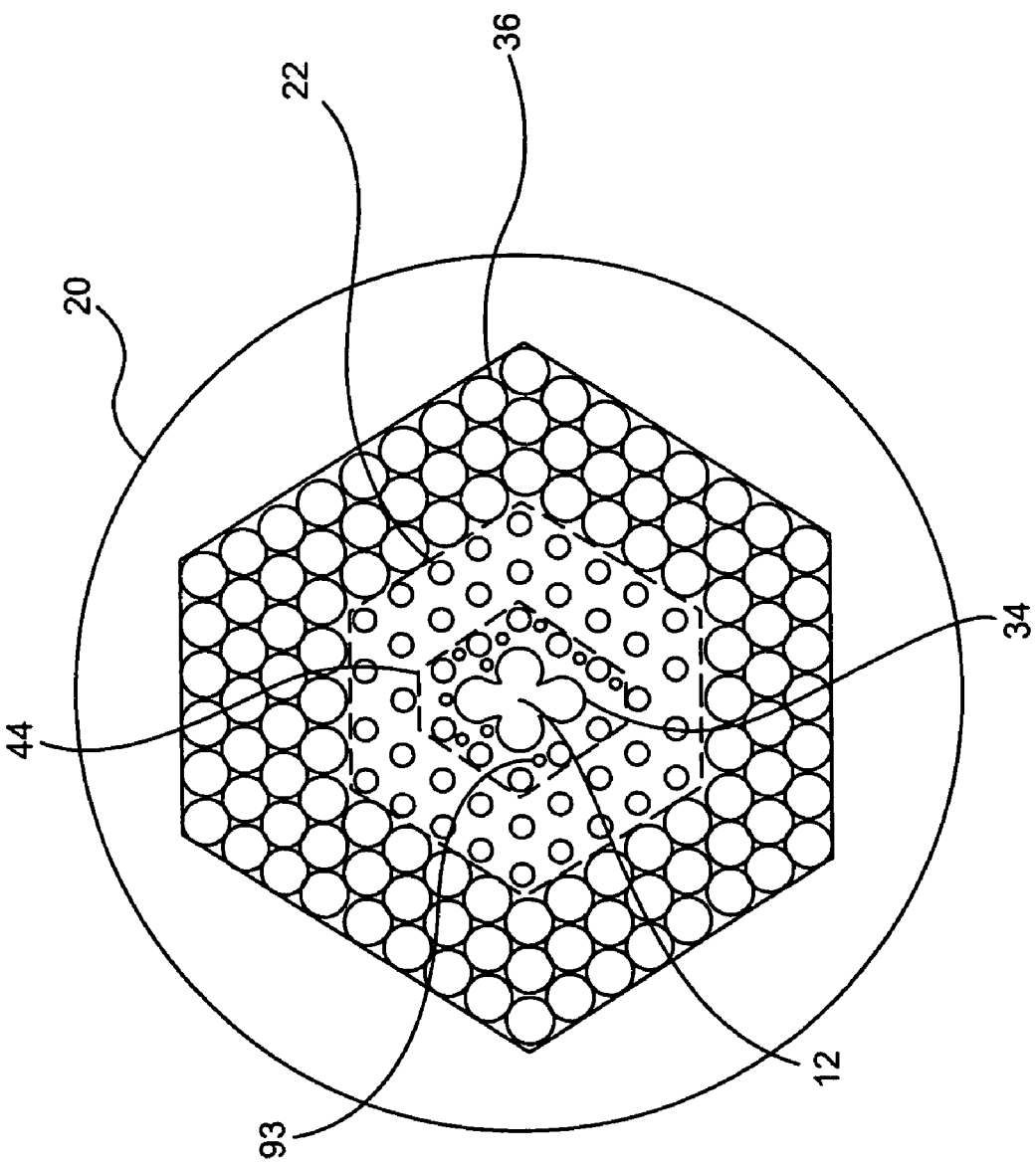
FIG. 2 is an illustration of a two band-gap photonic band-gap crystal fiber having a defect of an anisotropic nature, such as a cross shape and different hole sizes in the two band-gaps, according to the invention.
Figure 3:
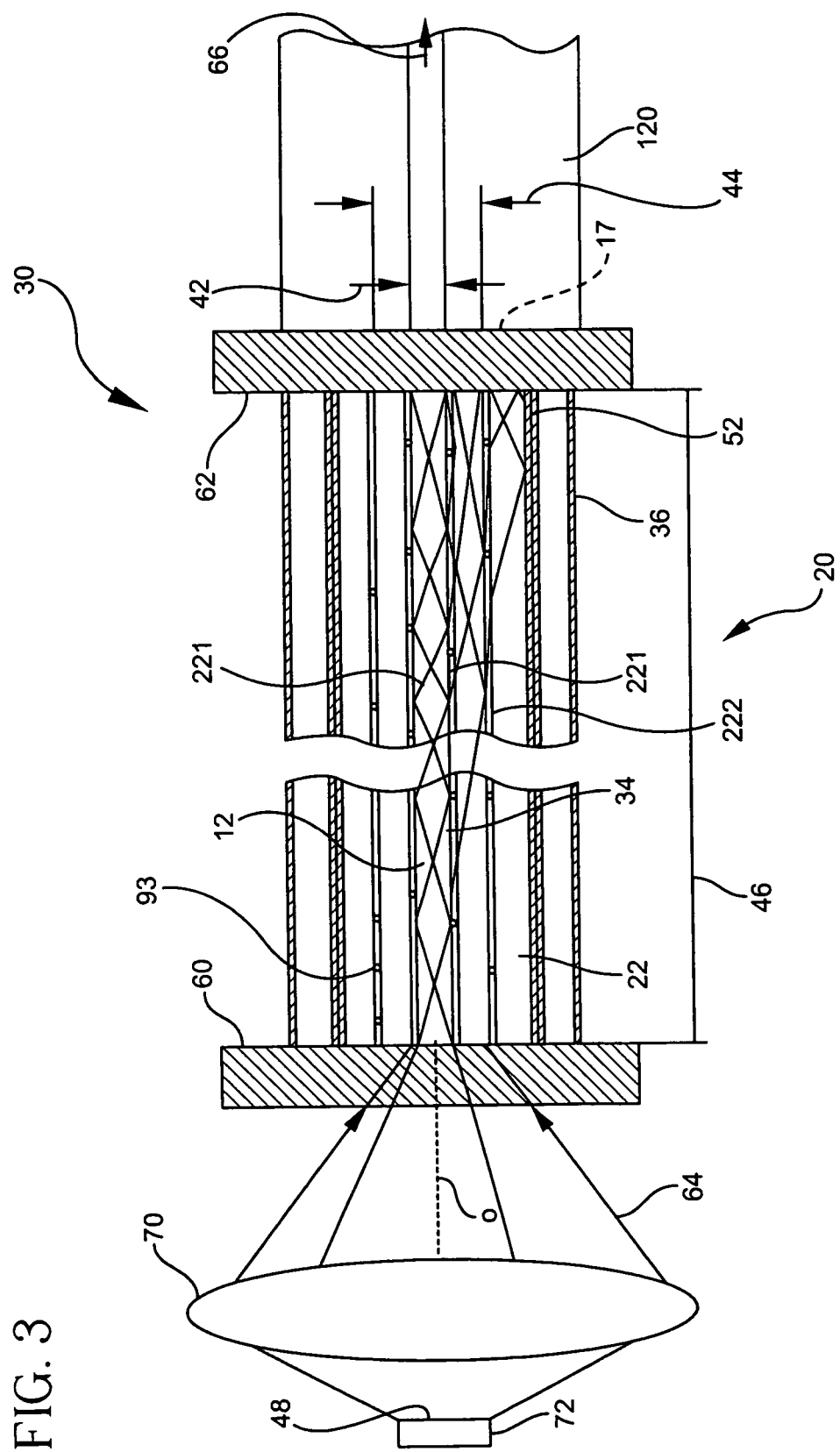
FIG. 3 is an illustration of a photonic band-gap crystal fiber used as a fiber laser, according to the invention.

Referring to FIG. 2, an example of a double-band-gap fiber laser profile is represented which adds a second band-gap to the structure of FIG. 1 and shows a differently shaped defect 34, as an example of possible variations. The fiber-laser profile includes three components: two band-gap regions 22 and 36 and a defect core 34. The two band gaps, an inner 22 and outer 36 band gap, provide the confinement for the light propagating in the fiber 20. The inner band gap 22 serves two purposes: it confines laser light to the central core mode of the fiber and acts as a multimode core for the pump light. The outer band gap 36 confines the multimode pump light to the inner band-gap region 22.

Figure 16:
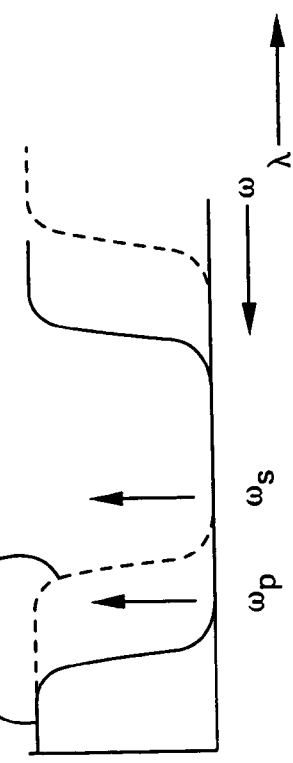
FIG. 16 is a graph of light transmission as a function of wavelength for a first type of pump and signal overlap for the active fiber of FIG. 15, according to the invention.
Figure 17:
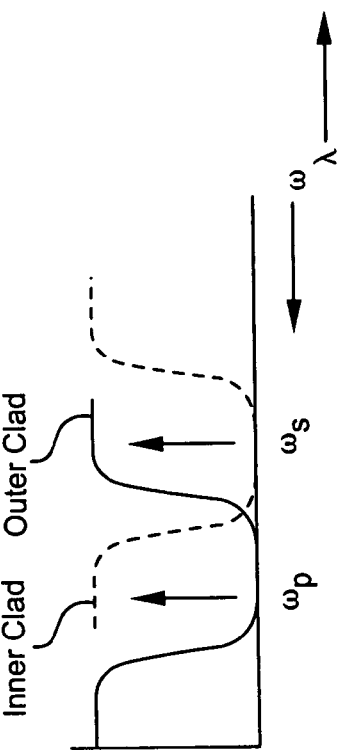
FIG. 17 is a graph of light transmission as a function of wavelength for a second type of pump and signal overlap for the active fiber of FIG. 15, according to the invention.

Referring to FIGS. 16 and 17, the two band-gap regions overlap in two different ways. Where the transmission T is low, a band-gap exists and band-gap guidance is enabled. Where transmission T is high, band-gap guidance is not enabled.

Referring to FIGS. 2-3, the solid line 34 shaped like a circularly-ended cross or a circularly-ended plus sign (+) indicates the region in which the fiber laser light travels in the low-index core defect 34. The hashed line 22 indicates the boundary of the inner band-gap, which serves two purposes: (1) to confine the fiber-laser light to the region delineated by the solid line 34 and (2) acts as a core for the multimode pump light. The region 36 outside the dotted line 22 confines light to the inner region 22. The band-gap of the inner cladding 22 is designed to confine laser light in the core 34. Light 221 having a frequency within the band-gap of the inner cladding is unable to travel through the cladding and is trapped. However, light 222 having a frequency outside of the first band-gap escapes through the inner cladding and leaks away. The band-gap of the outer region 36 is designed to confine pump light in the inner region 22 where the band-gap guides light by reflecting the light off the layered claddings.

In general, a double-clad structure that could be used as a fiber laser or as an amplifier includes two claddings. A first (inner) multi-mode clad acts as a multi-mode pumping core. The first cladding or clad is adjacent to a single-mode core, and a second clad surrounds the first clad. The first multi-mode clad or inner cladding serves as a waveguide with a high numerical aperture ($NA_{clad}$) for the input pumping light.

Referring to FIG. 3, a longitudinal cross-section of a brightness converter 30 using an optically active photonic band-gap fiber 20 of FIG. 2 is represented. The cross-section of the first multi-mode clad interface portion 44 of the inner cladding acting as the multimode pumping core ($D_{clad}$ is the dimension 44 of the inner cladding interface portion) may be designed to have a desired shape, e.g., matched to the near field shape of the pump source ($D_{laser}$ is the size of the broad-area laser light or of any other active source, such as a voltage source as an electrical pump having an emitting aperture 48 in a fast or slow axis) or any other scheme or shape which increases coupling efficiency of the pump beam. The numerical aperture ($NA_{clad}$) between the first 22 and second 36 clad layers must be large enough to capture the output of the pump laser diode or other active source 72. The actual increase in brightness (for the fiber laser serving as a brightness converter) depends on the interface clad to core ratio (CCR) of the pump cladding area to the core area, with the smaller the ratio (CCR), the greater the brightness increase. However, this disparity in area between the core and cladding cross-sections necessitates a long device length, since the absorption of the pump radiation is inversely proportional to this ratio (CCR). Conventionally high CCR ratios of pump cladding area to core area in conventional fibers not having band-gaps render achieving a high level of inversion difficult, because in general the higher the ratio (CCR), the lower the level of inversion that can be achieved with a given pump power. Hence, pump absorption and inversion are related.

According to the teachings of the present invention, optically active dopants 93, such as rare-earth elements or transitional metals, for example Er, Yb or Nd are not disposed in the empty air core 34 of the double-clad fiber amplifier/laser but disposed in the interface portion 44 of the inner cladding 22. On the other hand, active molecules can be disposed in the gaseous core 34 of the double-clad fiber amplifier/laser, instead of around the core.

In the case of three-level transition types of rare-earth elements such as Er, Yb or Nd trying to transition in a competing 4-level easier environment, more technical challenges have to be solved by a fiber laser/amplifier for three-level operation. Even with the very high power available from a diode laser bar 72, it is very difficult to reach the high level of inversion necessary for the operation of a 3-level system for lasers or amplifiers. If the Yb fiber laser provided by the active photonic band-gap fiber 20 is pumped with a single 2 W broad-area laser diode 72 and the input pump power $P_{in}$=1600 mW is actually launched in the inner cladding 22, for efficient laser operation, the threshold power required for lasing should not exceed about a quarter of the input pump power, or 400 mW. Taking $\alpha_P$=6 dB, $h\nu$=2.16×10$^{-19}$ J (for a pump frequency of 920 nm), $\sigma_{ap}$=8.3×10$^{-21}$ m$^2$, $\tau$=0.8 ms and $P_{th}$=0.4W, the cladding area is preferably $A_{clad}$=890 µm$^2$. Hence, for a Yb-doped 976 nm double-clad photonic band-gap fiber laser to provide the signal frequency of approximately 976 nm pumped with a 920 nm broad-area laser diode, the recommended values for core radius to pitch ratio are the ranges indicated by 14, 16, and 18 of FIG. 4, roughly in the range of 0.8-1.2, 1.3-1.5, and 1.7-2.2, respectively. Moreover, the cross-sectional area of the inner cladding should not exceed 900 µm$^2$ because the threshold should be decreased as much as possible.

A double-clad photonic band-gap Yb fiber laser with such a small radius to pitch ratio is realizable. For an 8 µm diameter circular core within a preferred 30 µm hexagonal inner cladding, the radius to pitch ratio of FIG. 4 can be reached.

The optimized design and dimensions of the double-clad active fiber 20, according to the teachings of the present invention, allows strong pump absorption while suppressing long wavelength ASE and allows a strong enough pump intensity to obtain 3-level operation. An input side of a 3-level or a quasi-3-level double-clad active photonic band-gap fiber or brightness converter 30, for use as an amplifier or a laser, is irradiated with a pump signal 64 at a pumping wavelength $\lambda_P$. The inner cladding 22 is constructed for multi-mode operation as a first band-gap crystal structure. A preferably single-transverse-mode defect core 34, centrally located within the inner cladding 22 for this example but can be aligned nonsymmetrically with the center point for polarized operation or for other reasons, is formed from the defect of the first photonic band-gap having the pitch and aperture size design as represented by FIG. 1. The defect core 34 does not have to be strictly single mode, a core on the border of being two-mode still works.

Preferably for the stated purpose of a fiber laser, the interface cladding portion 44 surrounding the defect 34 is doped with a plurality of optically active ions 93, such as ytterbium (Yb$^{3+}$), erbium (Er$^{3+}$) or neodymium (Nd$^{3+}$) ions, but other rare-earth elements can be used as the dopant. The double-clad active fiber 20 also includes an outer cladding 36 that is preferably made of a glass structure having a different second band-gap and having a larger hole size than the band-gap of the inner cladding 32. Instead of restricting the differences between the band-gaps to hole sizes, the band-gap of the outer clad can be tuned or otherwise optimized with respect to hole size, pitch (i.e., hole-to-hole spacing), refractive index of the glass webbing or the lattice design of the triangular, square or other shapes of the band-gap structure.

An all-glass design allows these types of refractive indices and the glass types include lanthanum aluminosilicate glasses, antimony germanates, sulfides, lead bismuth gallates, etc. A preferred material for the overclad is also a glass, for example, an alkali of boroaluminosilicate.

No attempt has been made to accurately illustrate their relative diameters in the cross-sectional area representations of the active fiber 20. However, the radius 21 of the signal and pump overlap portion as bounded by the interface portion 44 of the inner cladding 22 is preferably approximately about 1.1×-4× larger than the radius 2 of the defect core 34. This ratio could even be as large as 10×. Also, it is possible to use other gases, instead of air (n=1) as the core.

The length of the active fiber 20 is relatively unimportant beyond its being very long compared to the wavelengths involved so that any unbounded or leaky modes are adequately attenuated over its length. In practice, this length is determined by the level of rare earth doping in the interface portion 44 of the inner cladding and desired pump absorption efficiency. In some circumstances 1 cm in length is more than adequate.

The active fiber 20 includes two mirrors or filters 60, 62 defining the input and output ends respectively of an optical cavity 46 and serve as end reflectors. The input mirror 60 is made highly transmissive to an optical pump signal 64 at the pump wavelength $\lambda_P$ and highly reflective at the signal (lasing) wavelength $\lambda_S$ of the output signal 66 while the output mirror 62 is made partially reflective (partially transmissive) at the signal wavelength $\lambda_S$ and preferably also at least partially reflective at the pump wavelength. Even a 4% reflectance of the output mirror 62 across an air gap to a butt coupled output fiber 120 of an amplifier is sufficient to define the optical cavity 46. A single-mode fiber 120 is butt coupled to the output end of the core 34. If the brightness converter or fiber laser 30 is being used as a pump source for an erbium doped fiber amplifier (EDFA) or other doped optical amplifier, such as a Raman amplifier or fiber with Raman gain, the single-mode fiber is normally used as the pump fiber. Thus, the pump signal 64 is efficiently admitted into the optical cavity 46 at the input mirror 60, the optical cavity 46 being defined between the mirrors 60, 62, and some of the standing wave in the optical cavity 46 is allowed to pass through the output mirror 62.

For the ytterbium fiber laser provided by the active fiber 20 in this example, the signal wavelength $\lambda_S$ equals 978 nm corresponding to the three-level Yb$^{3+}$ transition for 3-level lasing and equals 1030 nm for 4-level lasing. Although the invention, where it concerns fiber lasers, is developed in view of Yb$^{3+}$ doping, as an example, it is not so limited. The fiber laser or brightness converter 30 may be doped with other transitional or rare-earth ions 93, such as Nd$^{3+}$. A combination of Yb and Nd doping, either by co-doping or by a sequence of differently doped fibers allows pumping at 800 nm rather than 920 nm.

Instead of using a separate focusing element 70, the optical characteristics of a broad stripe laser, as the active source 72, may be good enough to allow direct coupling into the multi-mode inner cladding 22. Regardless of direct coupling or not, the pump signal may be provided by a laser diode 72, in the form of AlGaAs or InGaAs broad stripes, arrays, or a diode bar emitting at a wavelength shorter than 976 nm but within the ytterbium absorption band. The practical pump band extends from 850 to 970 nm with a more preferred range being 910-930 nm and a most preferred range being 915-920 nm. The precise values of these bands and the lasing wavelength may shift by a few nanometers depending upon the dielectric host.

The more similar the elliptical, rectangular, oblong, or otherwise elongated aspect ratios of the diode or broad-area laser 72 and of the input of the multi-mode cladding 22 are (both vertically or horizontally aligned alike), the more suitable a lens or fiber-optic coupler, optical exciter, or other beam shaper or focusing element 70 can focus the relatively large-size output of a wide stripe or "broad area" laser diode 72 or even a diode bar into the wide multi-mode cladding 22 of the fiber laser/amplifier or other types of brightness converter 30. Preferably, the interface portion 44 of the inner cladding 22 has an optimized aspect ratio and sized sufficiently small to allow the coupling of pump light from the broad-area laser diode 72 to create sufficient high pump power density. The inner cladding of the double-clad fiber can be drawn into hexagonal shapes as represented in FIG. 1 or in other shapes, such as elongated ones, for example, ellipses or rectangles by various methods.

Figure 12:
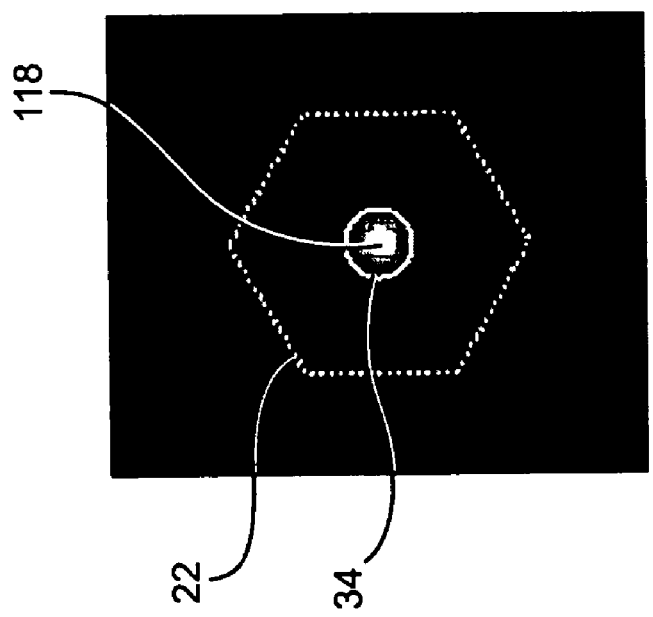
FIG. 12 is the output from a calculation demonstrating inner-clad guided modes in the double-clad photonic band-gap fiber configuration of FIG. 15, according to the invention.
Figure 11:
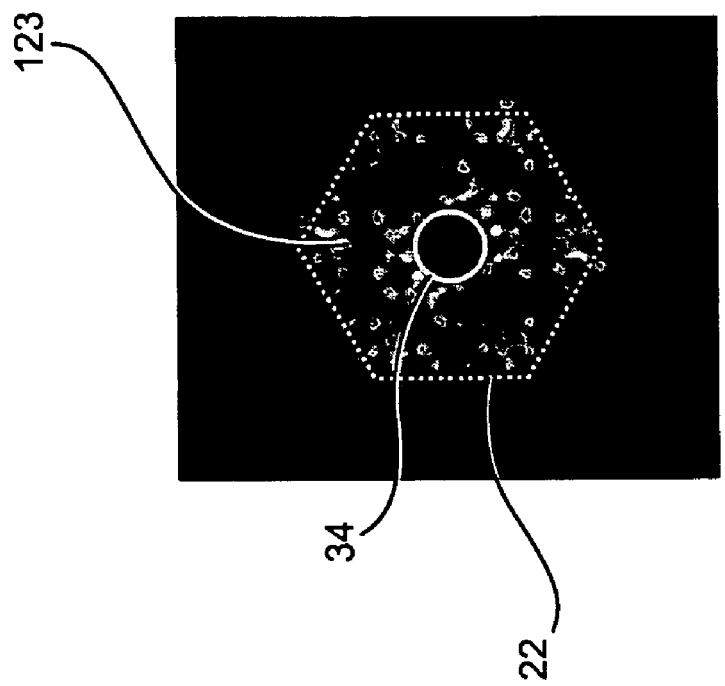
FIG. 11 is the output from a calculation demonstrating air core guidance in the double-clad photonic band-gap fiber configuration of FIG. 15, according to the invention.

When the doped double-band-gap fiber is used as a double-clad amplifier, with a small clad-to-core area ratio (CCR), cladding modes of the signal will overlap with the doped core to a sufficient degree to experience gain in the higher-order modes (HOM). Any mode of the waveguide has a certain profile of the optical field, as seen in FIG. 11, as referenced to the mode profile fiber of FIG. 15. It is only amplified as much as that field overlaps with the doped region 44 (partial doping of the cladding). Most of the field of the fundamental core mode is within the core 34, and that mode would obviously be amplified, if the required level of inversion were achieved. However, the inner cladding 44 supports many different modes because of its larger size. Some ions 93 will always transition spontaneously, giving equal amount of photons to every mode, core and cladding. If the interface portion of the cladding 44 is comparable in size to the core 34, at least some of the higher-order inner cladding signal modes, otherwise called surface modes will have a sufficient overlap of their field with ions in the interface portion 44 surrounding the core to also be amplified, as seen in FIG. 12. This will increase the laser or amplifier efficiency; because optical energy accumulated in the higher-order cladding modes (ASE) acting as surface modes will interact with the core modes to be coupled out a single-mode fiber output.

In general, a surface mode is defined to be a mode that exists on the interface between two regions that can be differentiated by different materials or different structures. Surface modes have a large percentage of their energy, such as greater than 50-70%, within the annulus or interface portion 44 containing the interface between the core 12 and inner cladding 22. Losses of surface modes can be controlled via core design and axial variation. Surface modes couple more easily to cladding and radiation modes because their overlap with radiation modes is larger than the overlap of radiation modes with core modes.

The band-gap structure of the outer cladding 36 is designed to include the signal wavelength or not, as seen in FIG. 16 and FIG. 17, respectively, depending on the interaction desired of the surface mode and the core mode. One approach to suppress cladding-mode amplification, which degrades amplifier and laser efficiency, is to eliminate confinement of the inner-cladding modes caused by the outer cladding. This is accomplished by decreasing the hole size of the outer cladding 36 to form an antiguide at the signal wavelength, so that signal cladding modes are not confined to the inner cladding and never lase, but the core modes are not noticeably altered. However, the outer cladding 36 has a band-gap structure which includes the pump wavelength.

Alternatively, or in addition, a portion of the inner cladding 22, not overlapping with the fundamental mode, is not doped with the signal enhancing dopant to suppress amplification of the inner cladding modes.

A second solution, for the amplifier example, is to perfectly mode-match the input and output single-mode fibers of an amplifier to the double-clad fiber core mode of the active fiber 20, used as the pump for the amplifier, so that very little light is launched into cladding modes of the amplifier. Otherwise, launching any light into the cladding modes of the amplifier would degrade its efficiency because some pump energy would be wasted on amplification of the cladding modes and never converted into a useful output. To mode match the input fiber to the core mode of a double-clad fiber, when the fibers are spliced, it is taught to ensure that mode field diameter (MFD) is the same for the input fiber and the double-clad core. Both MFD and numerical aperture (NA) should be the same for matching but core indices could be different. Even though actual index differences or index delta and core diameters may differ, what is needed is to match the MFD, NA, and align cores well.

The third solution is to use mode-selective feedback to ensure a fundamental mode-only laser operation. To provide mode-selective feedback, a signal reflector 52, in the form of the first band-gap 22 is provided around the defect core 34, to ensure stronger optical feedback for only the core mode. Since the internal loss of the PBGF is sufficiently small, then the laser efficiency is relatively insensitive to the external reflection. Only one mode now, the core mode of the double-clad fiber 20, will receive the feedback, and the cladding modes will not. Hence, the reflector 52 reflects the signal light to perform a mode selection function. The presence of the reflector 52 and mode matching will ensure that cladding modes never lase.

In general, maximizing the overlap between pumping light and doped boundary of the fiber core is advantageous. Thus it is desirable to make the core larger and inner cladding smaller. A larger core improves pump absorption and smaller inner cladding helps create higher inversion with less pump power. However, other factors limit the optimum core size to the one corresponding to a nearly two-moded core for a singlemode operation. However, multimode operation is possible by increasing the core size. The example easiest to follow for near singlemode operation is one using the Yb fiber laser at 980 nm.

An ultimate version of the graded index is a core that grades down in index all the way to the edge of the inner cladding 22. Then, there is no defined border between the core and inner cladding 22, they become one. And still the 0-order or fundamental mode of such a waveguide is confined in its very center with a relatively small MFD, and the higher order modes fill the total waveguide area more uniformly as provided by the teachings of the present invention by doping around the core.

As discussed, many factors affect the optimum design of a double-clad photonic band-gap fiber used as a waveguiding structure. A number of modes and their intensity (field) distribution within the waveguide depend on the waveguide shape, index contrast or index delta Δ, and core size.

For the case when a line between the core and the inner cladding (graded index) is hard to draw, the physical cross-sectional area ratio is not simply defined. In this unique case of a high-delta graded waveguide used as both the core and the inner cladding of a "double-clad" fiber, the modal area is defined as the physical area where the optical intensity of the mode is higher than $1/e^2$ of its maximum (or electric field amplitude is higher than $1/e$ of its maximum). In other words, when the core and the inner cladding form a single waveguide made of a material with a continuously varying composition such that the refractive index is progressively decreased (graded) from a central part to an edge of the waveguide, the central periphery of the defect of the waveguide is doped with the optically active ions having the three-level transition to form a doped area, then the overlap between the fundamental (zero-order) signal mode of the waveguide with the doped area is preferably designed to not be more than three times larger than the overlap of all pump modes of the waveguide combined with the doped area.

A similar definition can be given for the standard case, when the core and the inner cladding have a clear border, because once again, the pump uses many modes of the cladding and the signal only uses one mode of the core. However, for the standard case this definition would give almost exactly the same numerical value as the physical cross-sectional ratio of core to cladding (CCR).

The ratio of defect radius 2 to pitch 4 is selected to be in a range to enhance excitation of surface modes within the photonic band-gap, at a particular air-fill fraction based on the lattice hole size 42, in one embodiment. Specifically, the active periodic structure or photonic band-gap fiber 20 is designed to have a first pitch for configuring the band edges to provide the overlap for the surface mode radiated at the band edges for enhancing the core mode radiated from the defect state. In other words, the surface defined by the interface between the at least one photonic band-gap material and the defect that supports at least one surface mode propagating at that interface, overlaps the active portion of the structure and overlaps a state associated with the defect that overlaps the same active region of the structure.

Alternatively, the active periodic structure 20 is designed to have a first pitch for configuring the band edges and providing an overlap for a surface mode guided at the band edges for amplifying the evanescent portion of a core mode from the defect state for suppressing most of the surface modes.

Figure 14:
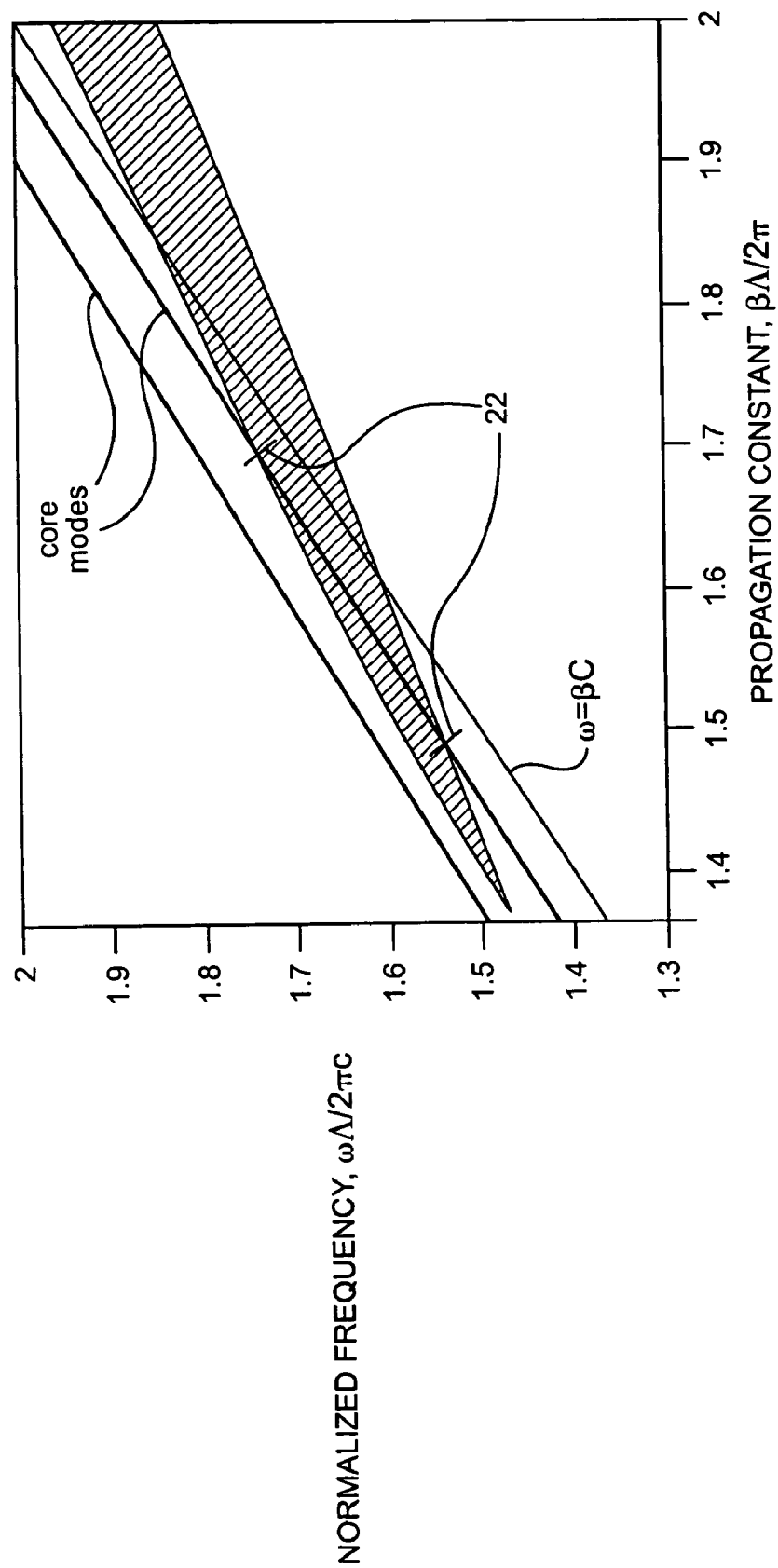
FIG. 14 is a graph of normalized frequency vs. normalized propagation constant for the photonic band-gap fiber of FIG. 1, according to the invention.

Referring to FIG. 14, a plot of a photonic band-gap (the solid region in the figure) for a triangular array of air holes, as in FIG. 1, is shown in a dispersion diagram. For a given normalized frequency, $\omega\Lambda/2\pi c$, the band-gap area represents a range of propagation constants, $\beta\Lambda/2\pi$ that is forbidden from propagating in the periodic lattice. Optical modes with propagation constants that lie above the light line, defined as the line for which $\omega=\beta c$, are allowed to propagate in air. The regions above the light line that overlap with the band-gap signify frequencies and propagation constants of modes that can exist in air, but are forbidden from propagating in the periodic lattice. From this it can be seen that introducing an air-core defect into the periodic lattice allows a mode to propagate in the air-core, which is forbidden from escaping into the cladding. The solid region represents frequencies and wavevectors of optical modes that are forbidden from propagating in a periodic dielectric lattice consisting of air holes on a triangular lattice in a substrate of silica. The lowest line represents the vacuum light line. Modes exist in vacuum (and to a very good approximation in air) only for points above this lowest line. The two higher lines represent the two lowest-order modes of a perfectly reflecting hollow cylinder to provide the two lowest-order cylinder modes or core modes.

The model of a perfectly reflecting hollow cylinder gives a good approximation to the dispersion properties of the air-core mode. The top two lines in this dispersion diagram show the dispersion dependence of the two lowest-order solutions for a perfectly reflecting hollow cylinder with a radius equal to the separation of the holes in the triangular lattice, as seen in FIG. 1. For this choice of radius, the photonic band-gap fiber will be single mode, since the higher-order cylinder mode does not fall in the band-gap. The portion of the first lower cylinder mode line falling in the solid band-gap region is where air-core transmission occurs bounded by the inner cladding 22.

The photonic band-gap fibers according to this embodiment of the invention thus guide signal light substantially within the core region. Optical energy introduced into the core region will have a propagation constant determined by the frequency of the light and the structure of the core region. Optical energy 221, as seen in FIG. 3, propagating in the core region of the fiber having a frequency and propagation constant within the band-gap of the photonic band-gap structure will not propagate in the photonic band-gap structure of the cladding region 22, and will therefore be confined to the core region 34. The photonic band-gap fibers of the present invention guide optical energy having a frequency within the band-gap of the photonic gap structure substantially within the core region with a loss of less than about 300 dB/km. Desirable photonic band-gap fibers of the present invention guide optical energy having a frequency within the band-gap of the photonic gap structure substantially within the core region with a loss of less than about 200 dB/km. Especially desirable photonic band-gap fibers of the present invention guide optical energy having a frequency within the band-gap of the photonic band-gap structure substantially within the core region with a loss of less than about 50 dB/km. In certain embodiments of the invention, photonic band-gap fibers guide optical energy having a frequency within the band-gap of the photonic band-gap structure substantially within the core region with a loss of less than about 20 dB/km.

The band-gaps 22 and 36 are designed to confine the light of the appropriate frequency to the appropriate region. For example, the higher-frequency or shorter-wavelength pump light is outside the band-gap of the inner region 22 so it will escape through the inner cladding and leak away to be confined by the outer cladding 36, while the lower-frequency or longer-wavelength laser light is in the band-gap of the inner region 22 so it is unable to propagate through the cladding and is trapped or otherwise confined inside the core 34. The higher-frequency or lower-wavelength pump light is inside the band-gap of the outer region 36 so it is unable to propagate through the outer cladding and is trapped or otherwise confined to the outer cladding 36. It is possible to have the laser frequency within or outside the band-gap of the outer region 36 for interacting the core mode and the surface modes differently. The design relies on the laser light being confined to the core 34 by the inner region 22, so the effects of the outer cladding region 36 on the laser mode will be minimal.

Unlike conventional optical fibers, the guidance of optical energy in photonic band-gap fibers does not rely on the refractive index of the core being higher than the refractive index of the cladding. As such, the core region may have a lower effective refractive index than that of the cladding region at the wavelength of the optical energy. As used herein, the effective refractive index of a region is defined as $$n_{\mathit{eff}} = \sqrt{\sum_{i=1}^{z} f_i \cdot n_i^2}$$

where $n_{\mathit{eff}}$ is the effective refractive index, z is the total number of different refractive indices $n_i$ in the photonic band-gap structure, and $f_i$ is the volume fraction for refractive index $n_i$. For example, in the photonic band-gap fiber depicted in FIG. 1, if core region 30 is filled with a gas or a vacuum, it will have a refractive index of about 1 at near infrared wavelengths. The effective refractive index of cladding region 22 will be higher than that of core region 30 due to the presence of matrix material 28.

As the skilled artisan will appreciate, the exact frequencies spanned by the band-gap of the photonic band-gap structure depend strongly on its structural details. The skilled artisan may adjust the band-gap by judicious design of the photonic band-gap structure. Computational methodologies familiar to the skilled artisan may be advantageously used in the design of the photonic band-gap structure. In one such technique, dielectric structures having a desired shape and refractive index profile may be defined geometrically. The frequencies and electric and magnetic fields of electromagnetic modes in a given dielectric structure are calculated by computer solution of Maxwell's equations. A trial solution is constructed by expressing the magnetic field as a sum of plane waves, with arbitrary (random number) coefficients. Maxwell's equations are solved by varying the plane wave coefficients until the electromagnetic energy is minimized. This is facilitated by a preconditioned conjugate gradient minimization algorithm. The mode frequencies, electric fields, and intensity distributions for each mode of the defined dielectric structure are thereby determined. This technique is described in more detail in "Block-Iterative frequency-domain methods for Maxwell's equations in a planewave basis", Johnson, S. J. and Joannopoulos, J. D., *Optics Express,* 8(3), 173-190 (2001). The skilled artisan will appreciate that the wavelength range of the band-gap scales with the size of the photonic band-gap structure.

As an example, if a triangular array of holes 26, whose cross section may not necessarily be circular, has a spacing or pitch 4 of about 4.7 µm, and air-filling fraction of 94% creates a band-gap ranging in wavelength from about 1400 nm to about 1800 nm. A scaled triangular array of holes 22 having a pitch 4 of about 9.4 µm and the same air-filling fraction will have a band-gap ranging in wavelength from about 2800 nm to about 3600 nm.

The photonic band-gap fibers of the present invention may be constructed to guide optical energy having a wide variety of wavelengths. In desirable embodiments of the invention, a photonic band-gap fiber is configured to guide optical energy having wavelength between about 150 nm and about 20 µm. In other desirable embodiments of the invention, a photonic band-gap fiber is configured to guide optical energy having wavelength greater than about 400 nm. In other embodiments of the invention, a photonic band-gap fiber is configured to guide optical energy having a wavelength less than about 20 µm. In embodiments of the invention that are especially desirable for telecommunications applications, a photonic band-gap fiber guides optical energy having a wavelength of between about 1400 nm and 1600 nm with a loss of less than about 20 dB/km. Other wavelengths of interest are 900 nm to 1200 nm. As the skilled artisan will appreciate, the photonic band-gap fibers of the present invention may be designed to guide wavelengths other than those specified herein.

In order to ensure single- or few-moded operation at a desired wavelength, it is desirable for the core region to have a relatively small cross-sectional area. For example, in desirable embodiments of the present invention, the core region has a maximum diameter less than about four times the pitch of the photonic band-gap structure of the cladding region. In especially desirable embodiments of the present invention, the core region has a maximum diameter no greater than about three times the pitch of the photonic band-gap structure of the cladding region.

Another embodiment of the present invention relates to photonic band-gap fibers that support guided modes having extremely low nonlinearities. In conventional optical fibers, light is guided in a glass material; the guided modes have effective nonlinear refractive indices ($n_2$) ranging from $2 \times 10^{-16}$ cm²/W to $4 \times 10^{-16}$ cm²/W. In the photonic band-gap fibers of the present invention, light may be guided substantially in a gaseous material. As such, extremely low nonlinearities have been achieved. In the photonic band-gap fibers according to one embodiment of the present invention, optical energy may be guided in a mode having an effective nonlinear refractive index $n_2$ of less than about $10^{-18}$ cm²/W. In desirable photonic band-gap fibers of the present invention, optical energy may be guided in a mode having an effective nonlinear refractive index $n_2$ of less than about $5 \times 10^{-19}$ cm²/W.

Photonic band-gap fibers with low nonlinearities may find utility in the transmission of high power optical energy (e.g. from a high power laser). As an example, a photonic band-gap fiber that guides light in an air core can be used to build a high power fiber laser. The modes of the air core have evanescent field components that extend into the perimeter of the air core. Calculations indicate that between 1 and 10% of the air-core mode energy extends beyond the air-core for appropriate designs. An exemplary design already discussed is to form a perimeter 44 of the air core with a series of hollow Yb-doped glass cylinders or channels doped with other optically-active ions, such as other transitional or rare-earth metals 93. The Yb-doped glass regions 44 are pumped with conventional semiconductor lasers. The air-core mode extracts gain through its overlap with the Yb-doped glass regions 44. With optimized defect radii in the design of PBGF, modes exist on the surface 44 of the air-core defect 34 and the photonic band-gap lattice 22. These modes can be used, along with refractively guided modes, to propagate pump light down the length of the PBGF. The pump light excites the Yb atoms 93 and establishes an inversion that supplies gain to the air-core mode.

In a 3-level systems with the competing 4-level transition, such as Yb at 980 nm or Nd at 940 nm, lasing/amplification cannot be achieved with any acceptable efficiency for any pump power density, if the restrictions on disposing the active dopant ions Yb on only the interface region between the cladding and the core are not followed, since the competing 4-level transition will lase first. It is already known that a certain pump power density is required first to reach the population inversion. It was not recognized and suggested until the teachings of the present invention, however, that the inversion level that can be reached with a given pump power and cladding doped area also depends on the amount of pump power left unabsorbed by the active medium, thereby leaving an area of the cladding undoped.

The discovery that surface modes can exist at the boundary between a photonic band-gap crystal and a defect therein is a key to the design and fabrication of photonic band-gap crystal waveguides that are efficient and practical in a telecommunications environment as well as in environments that include the delivery of high power electromagnetic waves.

To calculate the modes supported and the mode power distribution in the photonic band-gap crystal waveguide, Maxwell's vector wave equation having a position dependent dielectric function must be solved. A useful form of this wave equation is found at page 11, equation (7) of the Joannopoulos et al. reference cited above. Techniques for solving the governing equations are known in the art and appear for example in the publications: Steven G. Johnson and J. D. Joannopoulos, "*Block-iterative frequency-domain methods for Maxwell's equations in a planewave basis,*" Optics Express 8, no. 3, 173-190 (2001). In this publication, the authors summarize their work as: "Fully-vectorial eigenmodes of Maxwell's equations with periodic boundary conditions were computed by preconditioned conjugate-gradient minimization of the block Rayleigh quotient in a planewave basis, using a freely available software package." The freely available software package to which they refer is set forth in, Steven G. Johnson and J. D. Joannopoulos, *The MIT Photonic-Bands Package,* and is available on the internet at Universal Resource Identifier http://ab-initio.mit.edu/mpb/.

Figure 4:
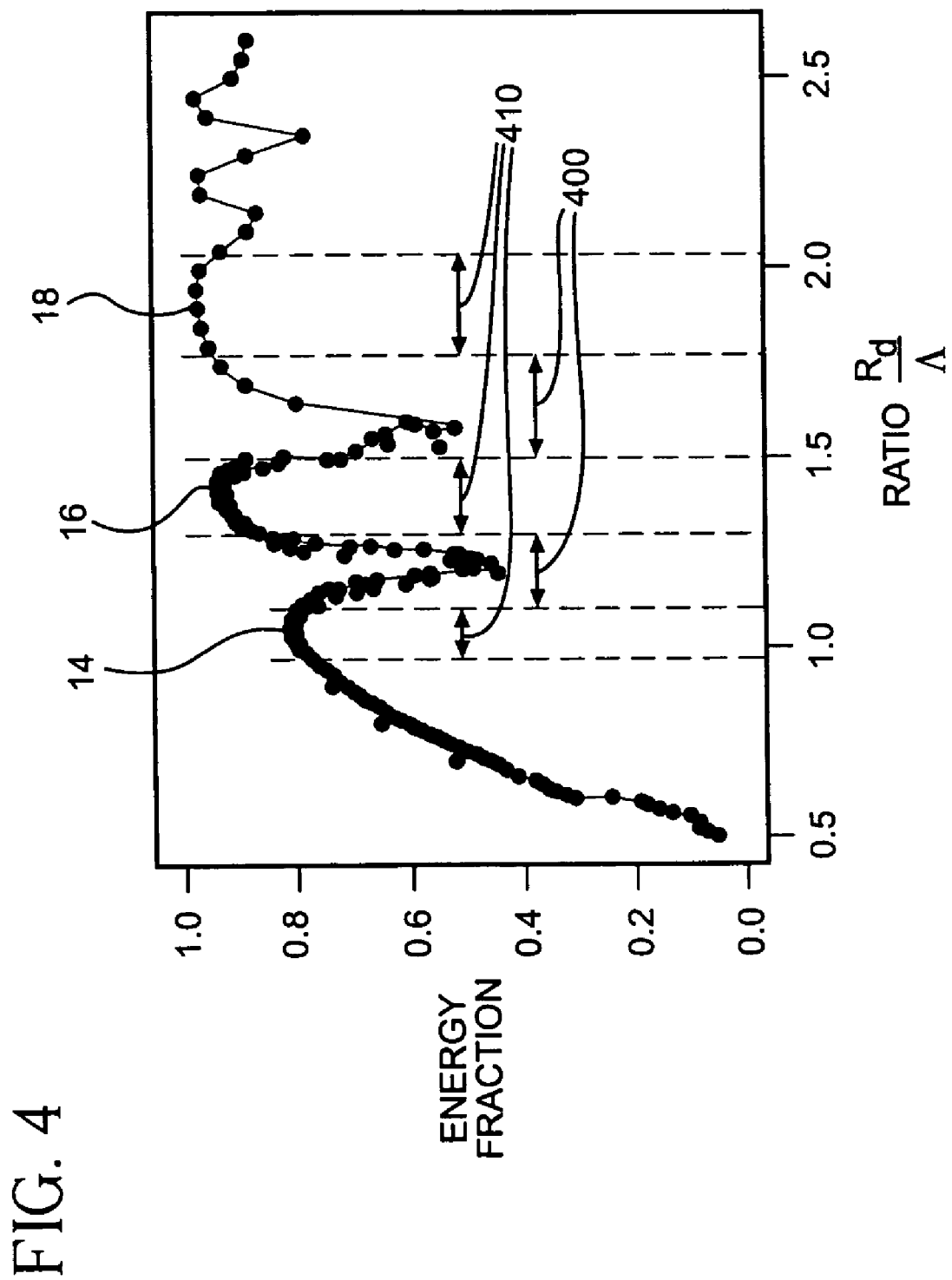
FIG. 4 is a chart of energy fraction of the propagated light mode within the defect versus numerical value to pitch ratio for a defect having a circular cross section, according to the invention.

Referring to FIG. 4, the results of the calculation as applied to a photonic band-gap crystal waveguide illustrated in FIG. 1 is shown as curve segment 14. The vertical axis of FIG. 4 is the fraction of the mode energy contained in the defect of the photonic band-gap crystal waveguide. The horizontal axis is the ratio of defect radius (numerical value of the boundary) to pitch. Curve segment 14 shows that mode energy fraction in the defect is a maximum at a ratio of about 1. The local minimum of curve 14 located near a ratio of 1.3 corresponds to a defect geometry that supports, i.e., propagates a surface mode. In alternative language, the defect geometry allows excitation of surface modes within the photonic band-gap.

This mode energy fraction is related to the volume fraction ($f_i$) or the fractional volume of air making up the photonic band-gap crystal that can be specified as having a particular value or range of values. The term fractional volume of air is the ratio of the volume of the crystal band-gap that is air to the total volume of the crystal band-gap in the cladding region. The fractional volume of the pores that may make up the photonic crystal is also a useful measure. In this case, the pores may be filled with air, be evacuated, or filled with a material having a pre-selected refractive index.

In general, the fractional volume of air is not less than 50%, greater than 0.67 or 67% or greater than 60% if the sol-gel method was used to make the band-gap. To achieve a light mode propagating with not less than 0.5 of the mode power in a circular cross-sectional defect (the mode power fraction), the ratio of radius to pitch is in the range from about 0.61 to 1.22. To achieve a mode power fraction in the defect of not less than 0.7, the ratio of radius to pitch has a range from about 0.63 to 1.19. To achieve a mode power fraction not less than 0.8, the ratio of radius to pitch has a range from about 0.8 to 1.16.

A mode power fraction not less than 0.9 can be achieved in a photonic band-gap crystal having a defect of circular cross section and a fractional volume of air not less than 0.83, with a ratio of radius to pitch having a range from 1.07 to 1.08. This particular embodiment of the waveguide in accord with the invention is single mode. For the circular defect cross-section with a mode power fraction not less than 0.9 that can be achieved in a photonic band-gap crystal having a fractional volume of air not less than 0.83, a ratio of radius to pitch having a range from 1.07 to 1.08 would suppress surface modes. The surface is defined by the interface 44 between the at least one photonic band-gap material 22 and the defect 12 that supports at least one surface mode propagating at that interface 44 and overlapping the active portion 93 of the structure and a state associated with the defect 12 that overlaps the same active region of the structure. Hence, preferably, one or two rows of doped ytterbium 93 around the interface 44 of the defect and first cladding (band-gap region) 22, are inserted to enhance the interaction of the surface modes with the core modes at a distance from the central defect at a radius to pitch ratio greater than 1.08. Preferably, the interface area 44 forms a portion of the microstructure or specifically, the inner cladding area 22, such that the microstructure area including the interface area 44 is about 10-300% greater than the interface area 44. In other words, the inner cladding region 22 including the interface area 44 is about 1.1-4 times greater than the interface area 44.

Specifically, the dopants 93 are dispersed at a radius to pitch ratio preferably at the local minima 400 of the mode energy confined to the defect as the defect increases in size and the boundary moves out farther into the photonic band-gap crystal, if the outer band-gap is not present or the band-gap of the outer cladding 36 is designed to not include the signal wavelength in its reflectivity window.

On the other hand, if an optional outer cladding 36 is added and its band-gap reflectivity window includes the signal wavelength, along with the pump wavelength, then in order to suppress the surface modes of the tail ends of the pump mode, active ions 93 are preferably dispersed at a distance away from the center of the defect at a radius to pitch ratio 410 at the local maxima of the core mode which are the local minimas of the pump or cladding modes.

Figure 5:
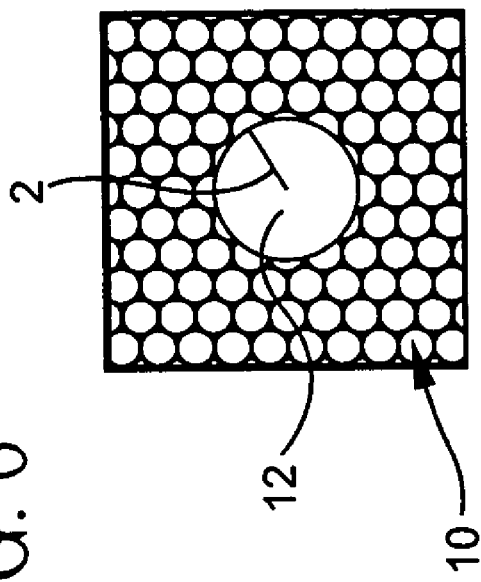
FIG. 5 is a cropped cross-sectional schematic view of an actively doped single photonic band-gap crystal fiber, having a circular cross section and a defect radius larger than in FIG. 1, according to the invention.
Figure 6:
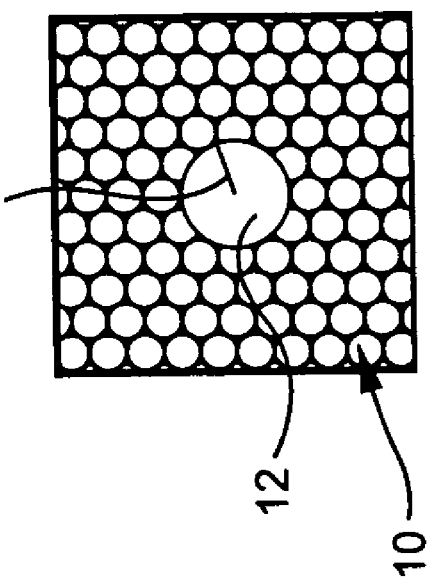
FIG. 6 is a cross-sectional schematic view of an actively doped single photonic band-gap crystal fiber, having a circular cross section and a defect radius larger than in FIG. 5, according to the invention.

Hence, in general it is preferred that the air filled fraction of PBGF (excluding the core) would be greater than. 0.7. FIGS. 1, 5, and 6 illustrate band-gap fibers 20 with an air filled fraction of 73.7% (0.737). Voids in actual fibers with such an air filled fraction ideal would vary in the range of between 0.7 and 0.74, with an average of 0.72 due to non-uniformity of the fiber profile. This calculation can be done by scanning a picture of the end of the photonic band-gap fiber, digitizing the scanned figure and, excluding the core area, and then measuring the ratio of the shaded areas to the non-shaded areas (the shaded area being the area occupied by the pores or air).

If an actual sample is available and had circular holes, the fraction can be calculated by measuring the dimensions of the cylinders (both inner and outer diameters), measuring the pitch between the cylinders and calculating the air-filled fraction from these numbers.

Referring to FIG. 5, a cropped representation of the invention essentially identical to that of FIG. 1 is shown, except that defect 12 is characterized by a ratio of about 1.5 instead of 1.0 of FIG. 1 for the same air-filling fraction of FIG. 1. The propagation characteristics of the photonic band-gap crystal waveguide of FIG. 5 is shown in curve segment 16 of FIG. 4. In the FIG. 5 embodiment, the fraction of mode energy confined to the defect represented in curve segment 16 is maximized at a radius to pitch ratio near 1.5. The local minimum of curve segment 16 that occurs near 1.6 is a photonic band-gap crystal waveguide configuration that supports or allows excitation of one or more surface modes.

Referring to FIG. 6, a cropped representation of an embodiment of the invention in which the defect radius to pitch ratio is about 2 is shown. This ratio is reflected in the location of the maximum of curve segment 18 in FIG. 4. As the ratio continues to increase, i.e., the defect increases in size and the boundary moves out farther into the photonic band-gap crystal, the fraction of mode energy confined to the defect continues to pass through local minima and maxima. Curve segment 18 corresponds to the photonic band-gap crystal waveguide illustrated in FIG. 6.

For a desired fraction of confined-mode energy, the range of allowed ratios can be read from the appropriate curve segment, 14, 16, or 18 in FIG. 4. For the smallest ratio embodiment of a photonic band-gap crystal waveguide in accord with the invention, as illustrated in FIG. 1, the waveguide is single mode and the optimum ratio provides for a fraction of mode energy confined to the defect near 0.8. The fraction of confinement is higher as defect radius 2 increases and additional modes are propagated in the defect.

Figure 7:
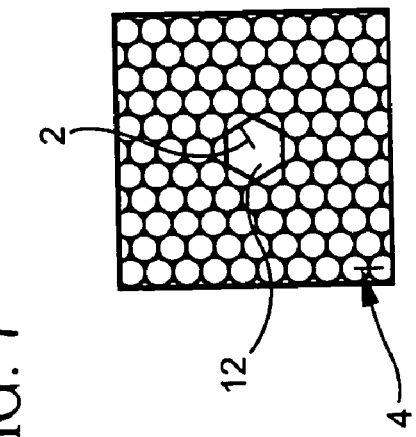
FIG. 7 is a cropped illustration of a photonic band-gap crystal having a defect of hexagonal cross section, according to the invention.
Figure 8:
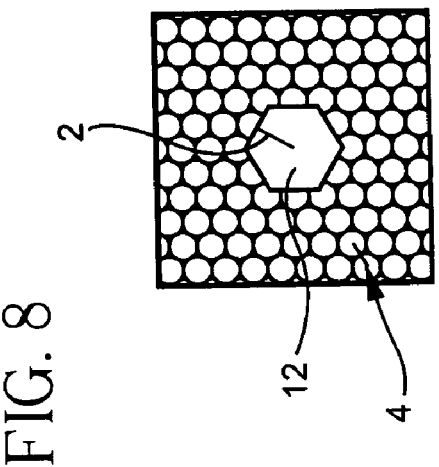
FIG. 8 is an illustration of a photonic band-gap crystal having a defect of hexagonal cross section with a radius larger than in FIG. 7, according to the invention.
Figure 9:
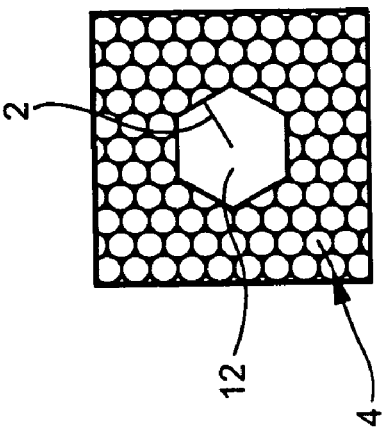
FIG. 9 is an illustration of a photonic band-gap crystal having a defect of hexagonal cross section with a radius larger than in FIG. 8, according to the invention.

Referring to FIGS. 7-9, additional embodiments of the photonic band-gap crystal waveguide in accord with the invention, and having a defect 12 of hexagonal cross section are shown. The photonic band-gap crystal or cladding region 22 in each of these embodiments is essentially identical to that of FIGS. 1, 5, and 6. The ratio of numerical value, radius 2 to pitch 4 is about 1 in FIG. 7, where the numerical value, radius 2, is defined as the perpendicular distance from the center of the hexagonal defect cross section to one of the sides of the hexagon. In the case of FIGS. 8 and 9, the value of the respective ratios of numerical value, radius 2, to pitch 4 is 1.5 and 2.0.

Figure 10:
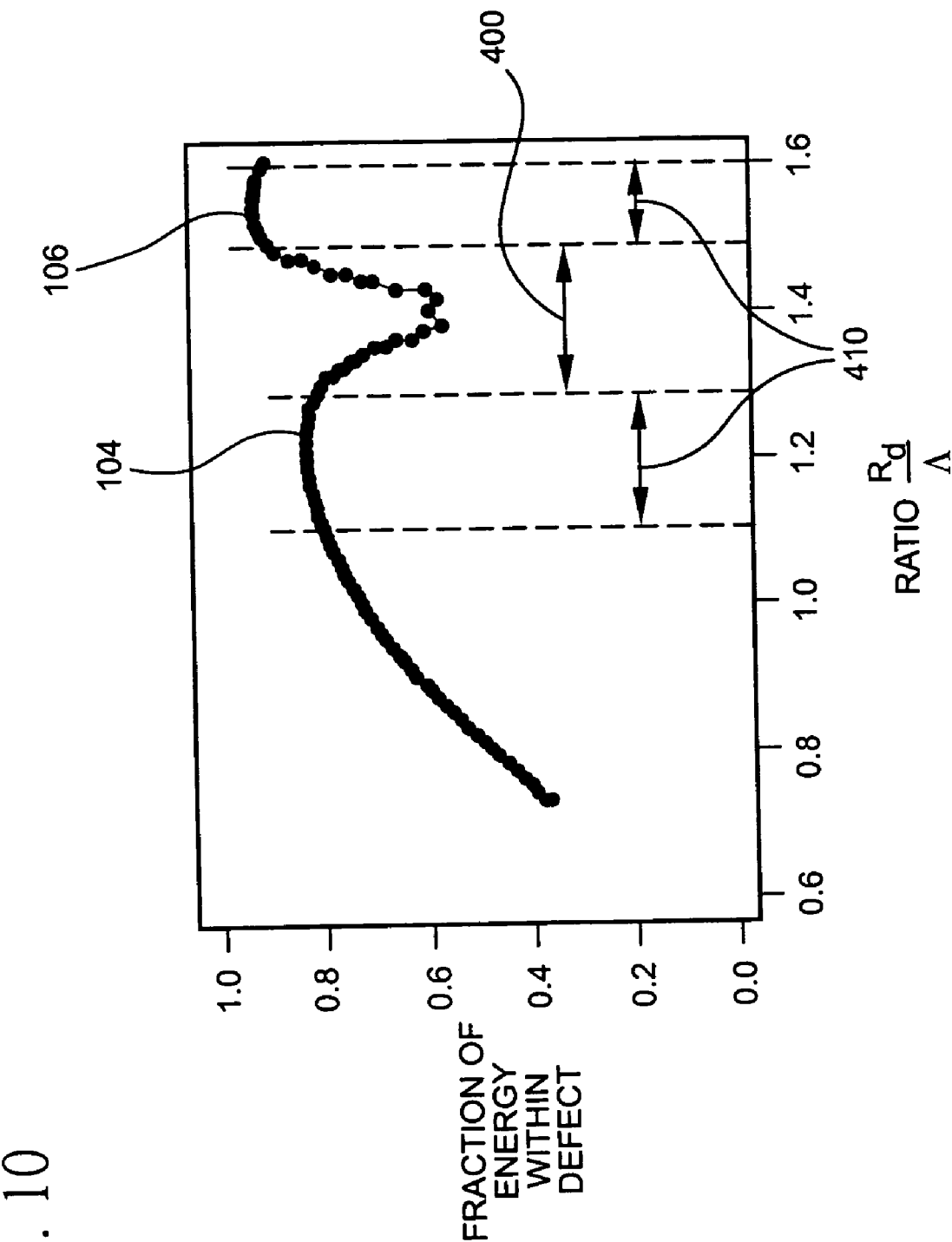
FIG. 10 is a chart of energy fraction of the propagated light mode within the defect versus numerical value to pitch ratio for a defect having a hexagonal cross section, according to the invention.

Referring to FIG. 10, a chart shows the fraction of mode energy confined to a hexagonal defect. The horizontal axis is the face of the regular hexagon divided by the lattice spacing. Curve segment 104 has a maximum of confinement near 0.8 at a ratio near 1.2. Another maximum having a confinement fraction near 0.9 is shown by curve segment 106 and is seen to occur at a ratio of about 1.5.

For this defect having a void of hexagonal cross section, the photonic band-gap crystal includes pores having a volume fraction not less than 0.67. The numerical value associated with the defect is the length of a line drawn from the center of the hexagon perpendicular to a side of the hexagon. For a mode power fraction within the defect not less than 0.6, the ratio of the numerical value to pitch has a range from 0.9-1.35. For mode power within the defect (mode power confinement fraction) not less than 0.8, the ratio of numerical value to pitch has a range from 1.45-1.65.

FIG. 4 and FIG. 10 demonstrate that the optimal operating points to achieve the best modal confinement are dependent on the design of the lattice and the defect. However, we find that any band-gap that can support a defect mode shows the same qualitative behavior of FIGS. 4 and 10. We teach that the oscillating structure of maxima and minima can be calculated by the techniques described in Joannopoulos et al. reference cited above, for any band gap of any photonic band-gap structure by calculating the defect modes for frequencies within the band gap for a given defect radius (or other parameter that defines the extent of the core defect). From a plot of confined modal energy versus scaled defect parameter, the optimal operating points for maximal confinement can be deduced from the maxima of the plot. Similarly we teach that the optimal operating points for enhancing surface-mode interactions can be deduced from the minima of the same plot of confined modal energy versus scaled defect parameter.

In accordance to the teachings of the present invention, preferably, one or two rows of doped ytterbium 93 around the interface 44 of the defect and first cladding (band-gap region) 22, are inserted to enhance the interaction of the surface modes with the core modes at a distance from the central defect at a radius to pitch ratio greater than 1.9. Specifically, the dopants 93 are dispersed at a radius to pitch ratio preferably at the local minima 400 of the mode energy confined to the defect as the defect increases in size and the boundary moves out farther into the photonic band-gap crystal, if the outer band-gap is not present or the band-gap of the outer cladding 36 is designed to not include the signal wavelength in its reflectivity window.

On the other hand, if an optional outer cladding 36 is added and its band-gap reflectivity window includes the signal wavelength, along with the pump wavelength, then in order to suppress the surface modes of the tail ends of the pump mode which coincides with the maxima of the core mode, active ions 93 are preferably dispersed at a distance away from the center of the defect at a radius to pitch ratio 410 at the local maxima of the core mode which are the local minima of the pump or cladding modes.

Similar calculations can be carried out for essentially any configuration of photonic band-gap crystal having a defect of essentially any cross section, for example, a curved cross shape or a circular plus sign (+) as seen in FIG. 2.

Figure 18:
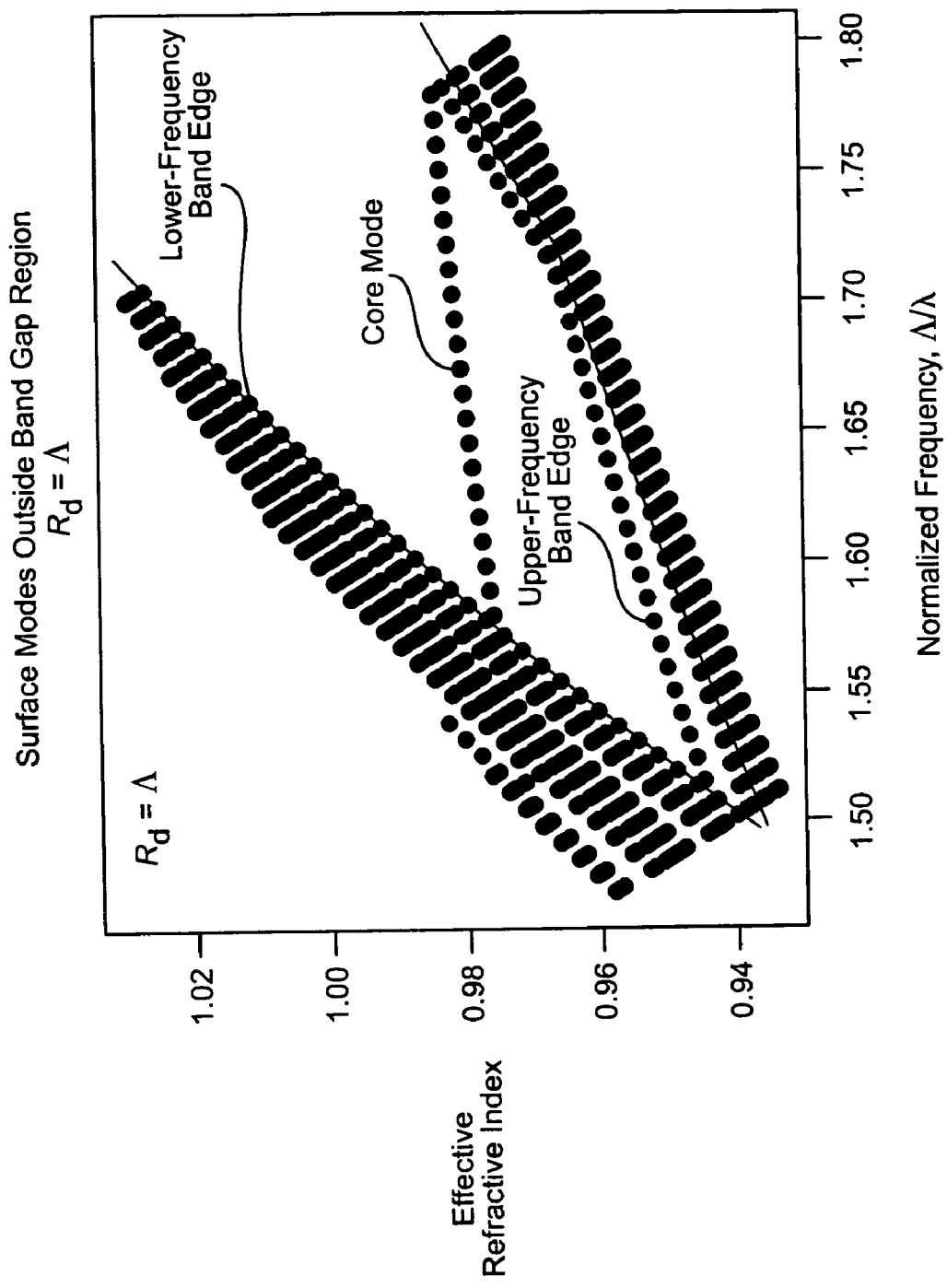
FIG. 18 is an illustration of a band-gap region having no surface modes.
Figure 19:
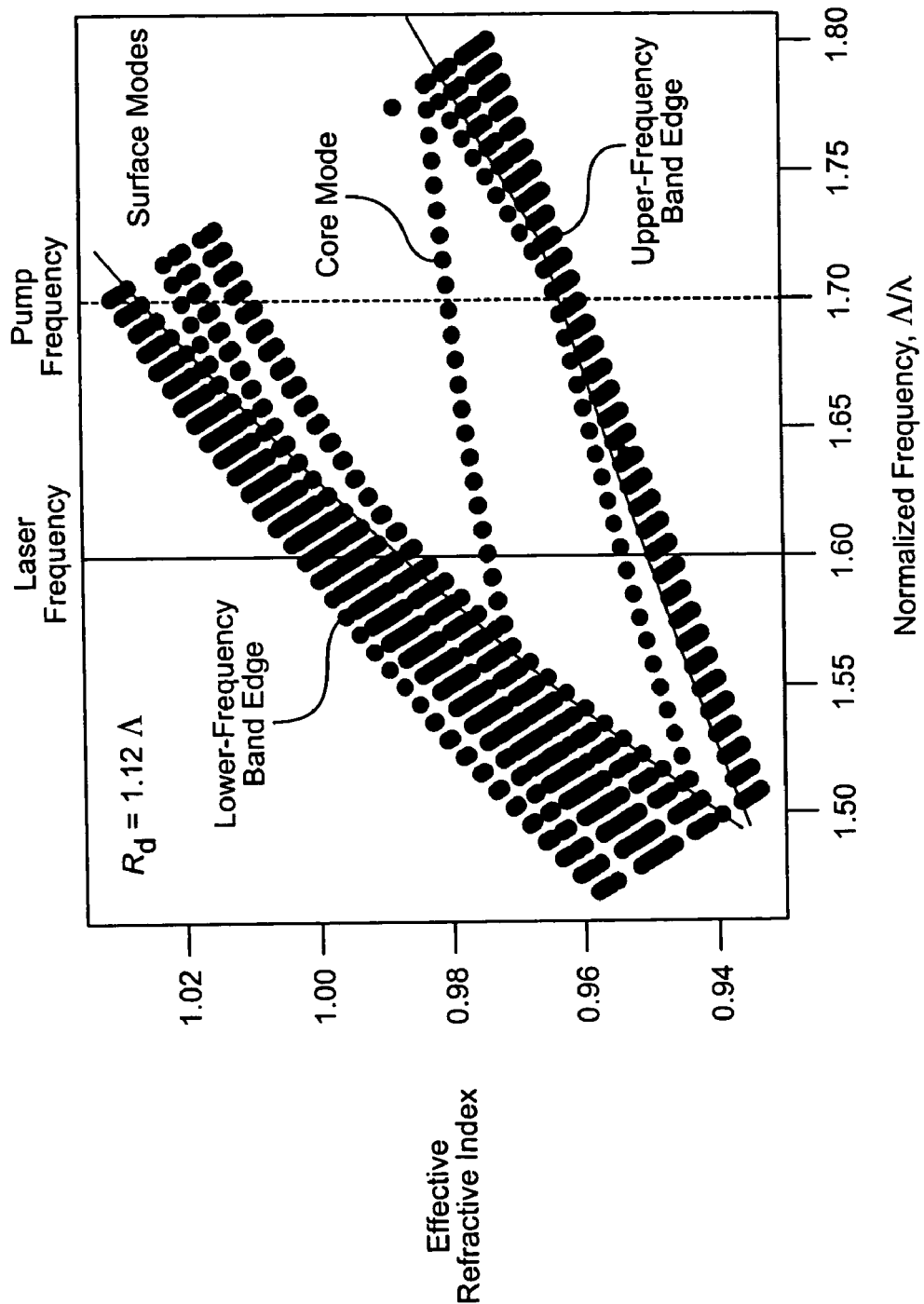
FIG. 19 is an illustration of a desired surface mode interaction within a band-gap region, according to the present invention.
Figure 20:
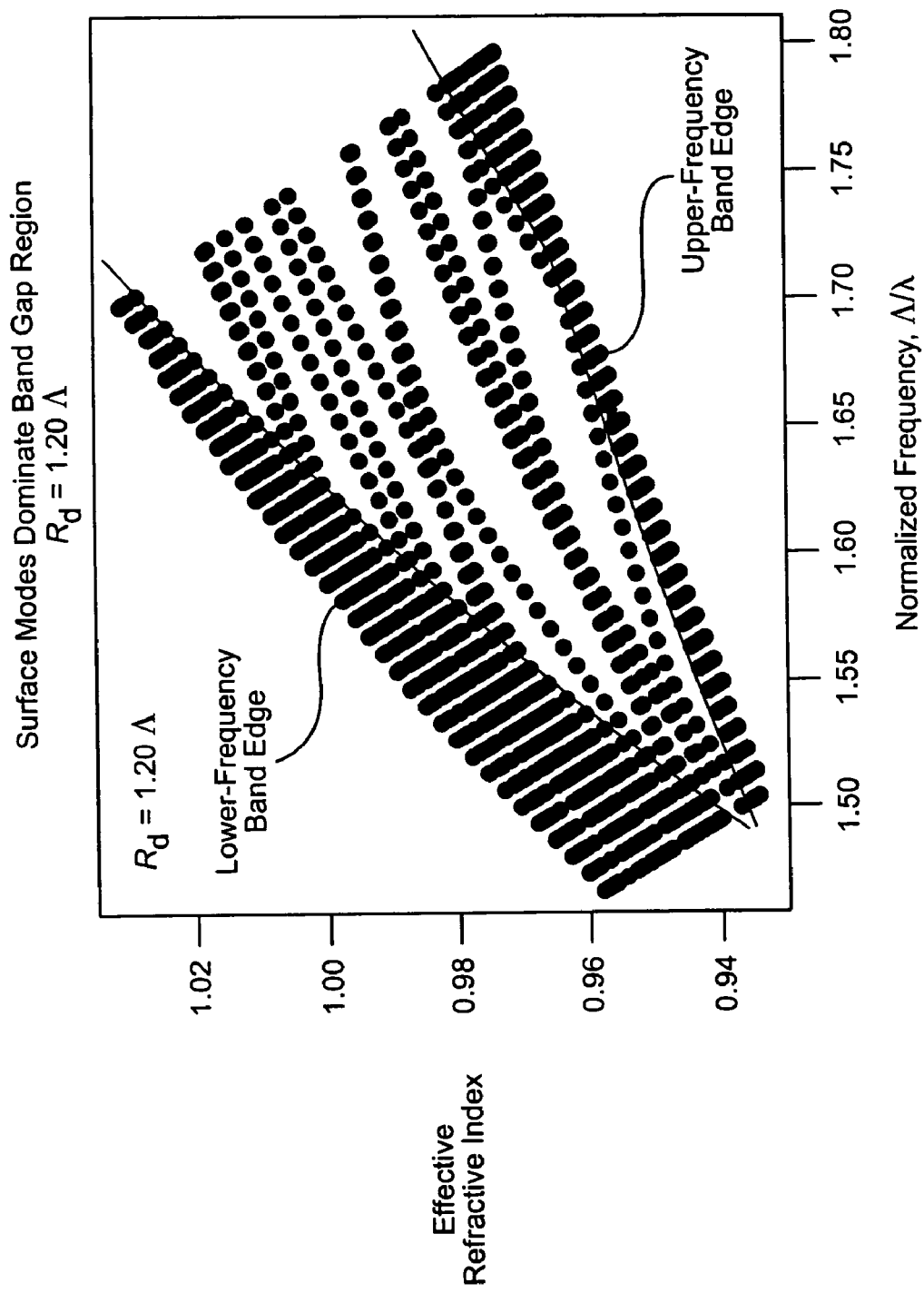
FIG. 20 is an illustration of a desired upper limit of surface mode interaction within a band-gap region, according to the present invention.

Referring to FIGS. 18-20, the desired defect dimension ($R_d$) to pitch ($\Lambda$) in a range from about 1.12 to 1.20 to provide sufficient surface mode interaction with the core mode in FIG. 19, is contrasted with insufficient surface mode interaction of FIG. 18 and almost too much surface mode interaction that there is no signal or core mode transmission in FIG. 20. It is to be appreciated that a ratio of defect dimension ($R_d$) denotes the radius of a perfect defect circle, one length dimension of a hexagonal shape, or some other kind of numerical value for a defect that is manufactured differing or otherwise distorting from the ideal designed shape. Hence, the ratio of defect dimension ($R_d$) to pitch ($\Lambda$) is approximately in a range from about 1.12 to 1.20, at a particular air-filling volume or ratio, such as 70% or the photonic band-gap or inner cladding having the pitch ($\Lambda$) between photonic band-gap aperture size $r_{cl}$ such that a ratio of $r_{cl}/\Lambda$ is in a range about $0.35 \leq r_{cl}/\Lambda \leq 0.5$. When the manufacturing tolerances and other design features change, the optimum ratio of defect dimension ($R_d$) to pitch ($\Lambda$) change accordingly to accommodate for any distortions in the defect. FIG. 19 shows the approximate minimum value for the ratio of defect dimension ($R_d$) to pitch ($\Lambda$) for configuring the band-gap region to provide the overlap for the surface mode radiated at the band-gap region for enhancing the core mode radiated from the defect state at the pump wavelength and suppressing the surface mode at the signal wavelength.

The optimum defect radius should not affect the results of FIGS. 16 and 17. The factors that change between FIGS. 16 and 17 are the lattice hole size, the pitch, the index of refraction, and other photonic band-gap design variables between the inner and outer cladding regions to form an optimum actively doped double-clad fiber of lasing or amplification.

FIGS. 19-20 show the surface modes, core modes and band edges while FIG. 18 does not show a surface mode because no surface modes are within the band-gap region when $R_d=\Lambda$. In FIG. 19, a solid vertical line indicates the laser or signal frequency and a dotted line indicate the pump frequency. Some surface modes are shown within a band-gap region where $R_d=1.12\Lambda$. Within the band-gap region, the dotted pump line intersects the surface modes and the core mode, while the solid signal line only intersects the core line. Hence, FIG. 19 illustrates that the light at the laser frequency is guided in the core, while light at the pump frequency can be guided in the core and the surface of the defect. However, in FIG. 20, surface modes dominate the core mode in the band-gap region where $R_d=1.20\Lambda$. It is to be appreciated that surface modes do not need to be used in the present invention. However, surface modes can improve the performance of a double-clad fiber laser or amplifier, in accordance with the teachings of the present invention.

The optimum defect radius range is related to the local minima or valleys indicated by 400 in FIG. 4 but more generally, to any range just away from the peaks 14, 16, or 18 of FIG. 4. Hence, a better characterization for the range of the ratio of defect size over pitch is: 1.08-1.40, with a preferred range being 1.08-1.16 and 1.26-1.32, as well as 1.46-1.70, as can be read from FIG. 4.

Along with optimizing the size of the signal and pump overlap region and optimizing the radius to pitch ratios for enhancing and alternatively suppressing the surface modes as seen in FIG. 17 and FIG. 16, respectively, the ideal design of the photonic band-gap or periodic structure would involve the optimization of the anisotropic or isotropic defect's aspect ratios, size, and orientation with respect to the crystal lattice orientation and spacing.

Referring to FIG. 21 and FIGS. 16-17, examples of how to use the band-gap diagrams to design a double-band-gap fiber laser or amplifier is shown. For a pump wavelength of 980 nm and a signal wavelength of 1040 nm and a lattice spacing or pitch $\Lambda$ of the inner and outer cladding of 2000 nm (or 2 $\mu$m), the normalized frequencies of the pump and signal are about 2.04 and 1.92, respectively, referenced in the vertical axis of FIG. 21. The confinement or band-gap areas, indicated by hashed marks are the frequencies or wavelengths inhibited from being propagated in the band gap of the respective claddings. Thus an inner-cladding void-filling fraction between 0.83 and 0.85 and an outer-cladding void-filling fraction between 0.85 and 0.92 would correspond to the double-clad design of FIG. 16.

Alternatively, the double-band-gap design could be implemented by using two different band-gaps. For example referring to FIG. 21, an inner-cladding void-filling fraction between 0.66 and 0.71 and an outer-cladding void-filling fraction between 0.85 and 0.92 would correspond to the double-clad design of FIG. 17. Optionally, other designs could include the outer-cladding having a smaller void size or void-filling fraction than the inner-cladding. For example, again referring to FIG. 21, an inner-cladding void-filling fraction between 0.83 and 0.85 and an outer-cladding void-filling fraction between 0.71 and 0.74 would have an outer-cladding void size smaller than that of the inner cladding.

There are other ways to achieve these configurations of FIGS. 16-17, other than by void-filling fraction, e.g., changing the lattice spacing or pitch $\Lambda$ of the two claddings, the index of the materials, the shape of the holes, and other photonic band-gap design variables.

Figure 15:
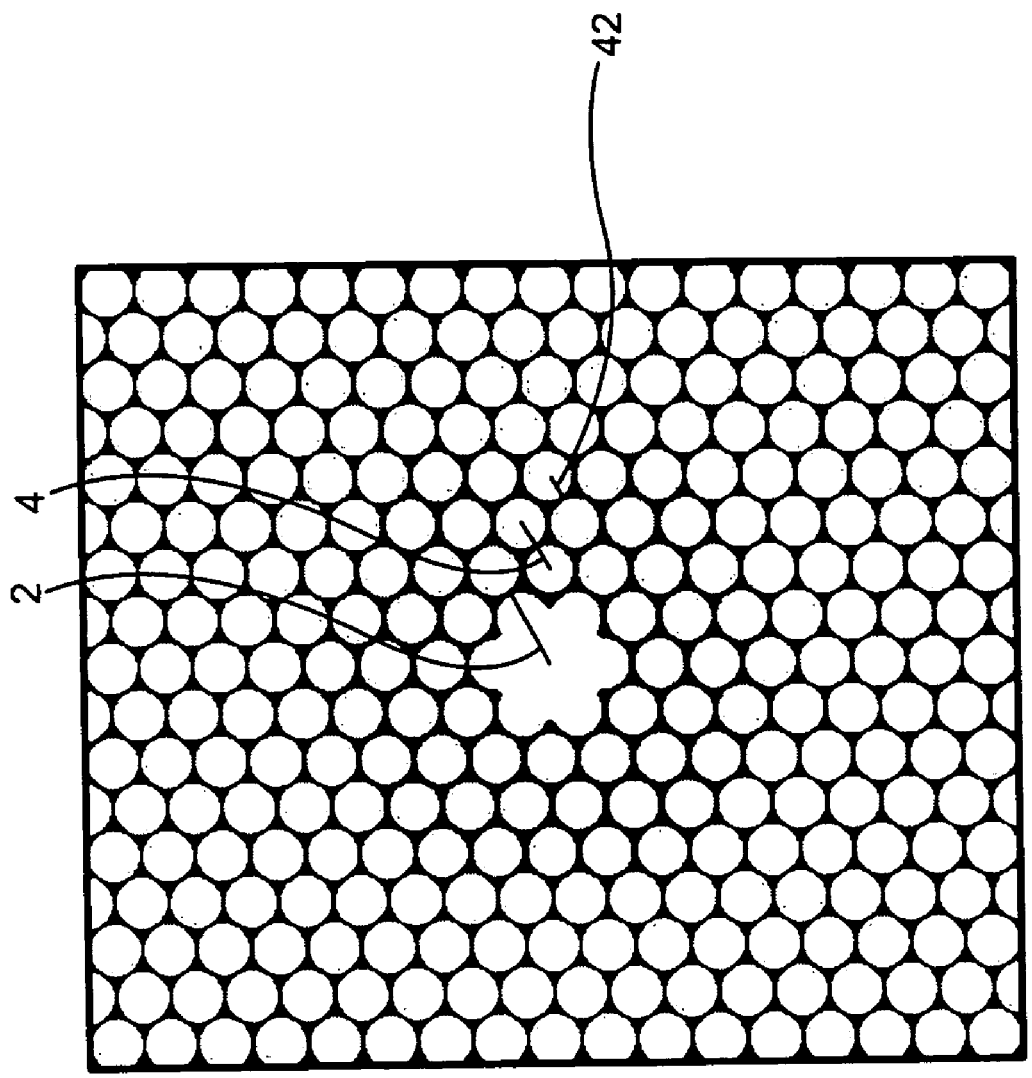
FIG. 15 is a mode fiber profile of a two band-gap photonic band-gap crystal fiber cross-section having a defect of a isotropic nature, such as a daisy shape and different hole sizes in the two band-gaps, as seen by the different webbing thickness, according to the invention.

Referring to FIGS. 11-12, mode profiles based on numerical calculations of the fiber profile similar to the double band-gap periodic structure of FIG. 15 are shown. This illustration of mode energy distribution is calculated. The mode in FIG. 11 shows high confinement in the central core defect region superimposed by the line 34, while the mode in FIG. 12 shows confinement of the light in the inner cladding region superimposed by the line 22. The frequency of the mode in FIG. 11 is lower and hence, the wavelength is longer, than the mode in FIG. 12, which is ideal for laser pumping where the lower wavelength pump energy is confined to the inner cladding 22 while the higher wavelength signal energy is confined in the defect 34. FIGS. 11-12 demonstrate that the concept of two band-gaps can guide light in two different regions at two different optical frequencies. The detailed structure of the inner-cladding region mode in FIG. 12 is indicative of a large numerical aperture. The large numerical aperture is also important for pumping fiber lasers.

Referring to FIG. 11, the light central portion of distribution 118 represents a concentration of mode energy at the defect center. Distribution 118 thus shows a large fraction of the mode energy confined to the defect.

Referring to FIG. 12, in contrast, the intersection of light in mode energy distribution 123 is characteristic of an inner cladding mode propagating the multimode core between the central void 12 and the outer cladding 36. Mode energy distribution 123 shows that the energy is largely propagated outside the defect, and thus can be overlapped with the optically-active dopants dispersed in the cylinders around the perimeter of the core 12.

Figure 13:
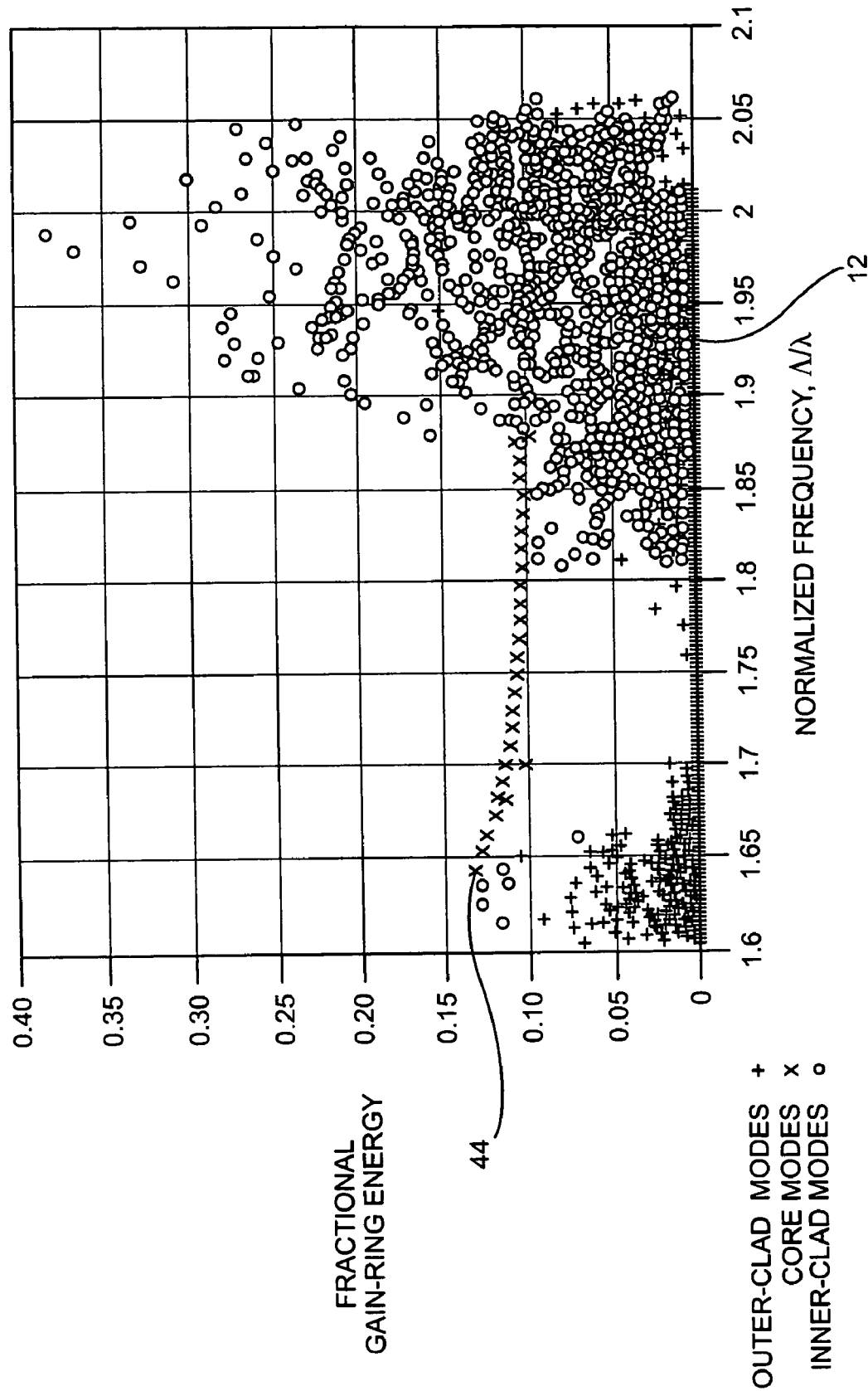
FIG. 13 is an illustration of the fractions of mode power within an annulus defining the signal and pump overlap portion in a photonic band-gap crystal having a defect for the modes having a large energy fraction within the defect and for the overlapping surface modes of the core and inner-clad modes, in the context of outer-cladding modes, according to the invention.

Referring to FIG. 13, an energy distribution is shown. Calculation of the energy distributions of the fiber laser modes indicate that it is possible to get approximately 10% of the energy of the laser mode to overlap with the region 44 of FIG. 1 surrounding the laser core. The calculations also indicate that the higher frequency (shorter wavelength) modes in the inner clad region (x symbols) can have an overlap with the gain region of an average of roughly 10%. The gain region is where the active ions are located in the interface or pump and signal overlap portion 44. These values indicate that such a double-band-gap approach represents a feasible amount of overlap to provide sufficient pump absorption and gain extraction in a fiber laser configuration.

The photonic band-gap crystal waveguide or fiber can be made using any of a number of methods known in the art. The methods allow the skilled practitioner to make a wide range of shapes of the photonic band-gap crystal features as well as the defect cross section. In general, the photonic band-gap fibers of the present invention may be fabricated using methods analogous to those used in fabricating conventional optical fibers, photonic band-gap fibers, or other types of waveguides. The skilled artisan will recognize that other methods and materials may be used to make the photonic band-gap fibers of the present invention. For example, extrusion techniques, such as those described in U.S. Pat. No. 6,260,388, may be used to make the photonic band-gap fibers of the present invention. In another variation, the fiber can be made using conventional stack-and-draw techniques. Other available methods include triple-crucible draw and the rod-in tube technique, with the parts machined into a desired shape. CVD, sol-gel, and soft glass in tube are other available methods.

Another embodiment of the present invention relates to an optical fiber capable of supporting a temporal soliton having a peak power of greater than 3 MW. As is familiar to the skilled artisan, a temporal soliton is an optical pulse that is transmitted along a length of optical fiber without spreading appreciably in pulse width. In soliton transmission, the interplay of dispersion and nonlinearity serves to maintain the temporal pulse envelope over long distances. In certain embodiments of the present invention, the temporal soliton may have a peak power of greater than 3 MW. The optical fiber according to this aspect of the present invention may be, for example, a hollow-core photonic band-gap fiber as described above.

The low nonlinearity of air-core photonic band-gap fiber has also been used to compress amplifier pulses in a chirped-pulse amplification approach to achieve high peak power amplified pulses.

Various modifications and variations can be made to the present invention without departing from the spirit and scope of the invention for actively doping any type of microstructure fiber with a core that is a void. The types of microstructure fiber can be combinations or hybrids using only photonic band-gap guidance or photonic band guidance and TIR.

Figure 22:
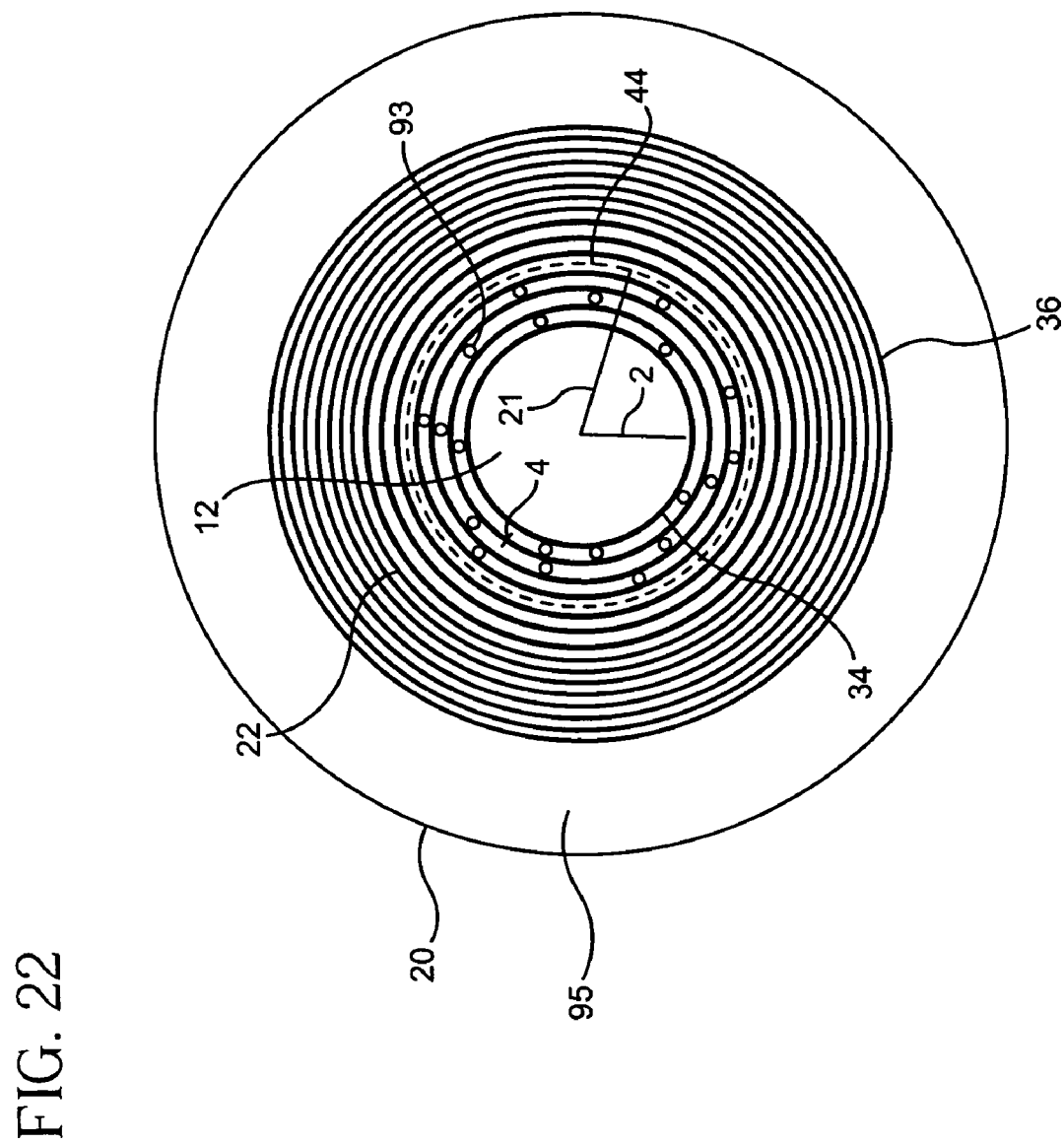
FIG. 22 is a cross-sectional schematic view of a double-photonic-band-gap Bragg fiber having a cladding structure of concentric layers surrounding a large central core.

Referring to FIG. 22, an alternative example of a double-band-gap fiber laser profile is represented which uses a different two-dimensional structure from that of FIG. 2. The fiber-laser profile includes three components: two band-gap regions 22 and 36 and a defect core 34. The two band-gaps, an inner 22 and outer 36 band-gap, provide the confinement for the light propagating in the fiber 20. Instead of voids, the band-gap regions consist of alternating layers of refractive index that those practiced in the art will recognize as Bragg reflectors or thin-film interference coatings. Such a fiber 20 will be referred to as a Bragg double-photonic band-gap fiber. The pitch 4 and layer refractive indices in band-gap region 22 may differ from those of region 36 in order to produce a band-gap over a different range of frequencies. The number of layers in band-gap regions 22 and 36 may be varied from those shown in FIG. 22 to provide the desired reflectivity, modal confinement and overall fiber dimensions. The band-gap design of such layered structures is well known and is taught elsewhere. The inner band-gap 22 serves two purposes: it confines laser light to the central core mode of the fiber and acts as a multimode core for the pump light. The outer band-gap 36 confines the multimode pump light to the inner band-gap region 22. According to the teachings of the present invention, optically active dopants 93, such as rare-earth elements or transitional metals, for example Er, Yb or Nd, are not disposed in the empty air core 34 of the double-clad fiber amplifier/laser but disposed in the interface portion 44 of the inner cladding 22. On the other hand, active molecules can be disposed in the gaseous core 34 of the double-clad fiber amplifier/laser, instead of around the core.

Referring to FIG. 23, a cut-away, magnified view of a Bragg double-photonic-band-gap fiber similar to that shown in FIG. 22 is modified to create surface modes in the core region. Surface modes are created at the core/inner-cladding interface 34 by modifying the original pitch 4 into a smaller pitch 4' or modifying the refractive indices of the layers closest to the core 12 or terminating with an incomplete period of the original pitch 4. The modified layer spacing 5 to create the collapsed pitch 4' or change in refractive index is chosen such that one or more surface modes are created in the gain region 44 with frequencies and propagation constants that couple these modes to the core-confined signal mode.

Referring back to FIG. 22, an alternative embodiment of the Bragg photonic-band-gap fiber can be described in which band-gap regions 22 and 36 have the same parameters such that their band-gaps are indistinguishable. The refractive index of region 95 is chosen to be lower than the effective refractive index of regions 22 and 36 such that the confinement of the pump light to regions 22 and 36 is through the mechanism of total internal reflection (TIR). In this embodiment the parameters that define the frequency range of the band-gap of regions 22 and 36 are chosen such that the frequency of the pump light lies outside of the frequency range of the band-gap.

The present invention also covers fibers with a holey lattice for pump-guidance through TIR. Referring back to FIGS. 2 and 15, outer capillary air holes are shown that are larger than the inner capillary air holes. Hence, a hollow core is surrounded by first set of capillaries filled with air to form a first air-clad or inner cladding and a second set of air-filled capillaries with diameters larger than the first set of capillaries so as to form a second air cladding with a lower effective refractive index than the first air cladding. This difference between the refractive indices will cause the pump light to experience TIR at the interface between the two "holey" regions. The outer, or second, air cladding may or may not also have a band-gap. Whether or not the pump light is confined through a band-gap effect or through a TIR effect, the definitions of the gain region, core region and surface modes in the present invention are completely unaffected. So the teachings for creating surface modes and for obtaining a band-gap on the inner cladding are unchanged.

The mechanisms that confine the pump light define the various possible embodiments. If the band-gap of the inner cladding includes the pump frequency then only one photonic band-gap lattice is needed in which both the pump and signal light are confined to the core region by a band-gap effect. In this case a second photonic band-gap region is not necessary and the pump region near the core will be quite small and hard to couple into from an external diode laser source.

If on the other hand, a bigger pump region is desired, then a way to confine the light to this region is needed. The lattice within region 22 cannot have a photonic band-gap at the pump frequency because this would prevent the pump from propagating in 22. However region 22 can be surrounded by a second cladding that can guide through either TIR or band-gap at the pump frequency. For a band-gap, the air holes may be either smaller or larger depending on which of the band-gaps you design for. For TIR two choices are possible.

As one option, the second or outer cladding region 36 can have larger holes than those of inner cladding region 22 so that the effective index is lower than that of inner cladding region 22. Basically, more air is put in the outer cladding and so its effective refractive index will drop because air has a lower index than silica. These air holes need not be periodic. Ideally, it would be preferable to surround the inner cladding with air and no glass at all to get the maximum numerical aperture. But this would make a fragile fiber that would be difficult to handle.

The second option would be to find a solid material that has an effective refractive index lower than that of region 22. This way only one lattice is needed. However, the effective index is less than 1.2 and no low-loss solid materials have such a low index. Thus air or a gas is needed.

Thus, an optically active hollow-core PBGF can enable various uses, such as for amplifying and generating narrow-band optical fields or pulsed optical fields with greatly reduced nonlinear impairment Such a "single-frequency" or narrow-linewidth amplifier is made possible by the active hollow-core PBGF because the resultant SBS threshold in the air-core PBGF allows narrow-linewidth sources to propagate and amplify.

It will be apparent to those skilled in the art that various modifications and variations can be made to the present invention without departing from the spirit and scope of the invention. For example, the optically active hollow-core photonic band-gap fiber could be used throughout a system intended for the generation and amplification of optical fields. The optically active fiber could be pumped in an oscillator configuration that is subsequently amplified in a serial chain of optically active hollow-core photonic band-gap fibers configured to operate as amplifiers. The amplifiers could also be assembled to operate in parallel, rather than series, to generate a series of optically coherent outputs.

Thus, it is intended that the present invention cover the modifications and variations of this invention provided they come within the scope of the appended claims and their equivalents.

What is claimed is:

1. An apparatus comprising:
   a band-gap light guidance region having a hollow void within which light is guided by a band-gap effect;
   a microstructure disposed adjacent to the hollow void for enhancing light guidance; and an active gain material disposed in an interface area between the hollow void and the microstructure for providing active gain to the light guidance, wherein the microstructure comprises an active periodic two dimensional dielectric structure of a first periodicity having a plane of periodicity and comprising an active element and configured to produce a photonic band-gap having a first band-gap region; and a second periodic structure of a second periodicity adjacent in the plane to the active periodic structure for confinement of optical energy by a second band-gap, the active periodic two dimensional dielectric structure structured and arranged to be optically pumped by an excitation source to provide optical gain at the wavelength of the first band-gap region in a direction perpendicular to the plane of periodicity, the active periodic structure having a first void-filling fraction, and the second periodic structure having a second void-filling fraction, the second periodic structure being positioned adjacent to the active periodic structure.

2. The apparatus of claim 1, wherein the first void-filling fraction is smaller than the second void-filling fraction for confinement of the optical pump radiation using total internal reflection.

3. The apparatus of claim 1, wherein the first and second periodic structures are dielectric structures each having a periodic array of channels having the same first and second void-filling fractions configured to form a single band-gap that contains both a signal wavelength and a pump wavelength such that a signal mode and a pump mode are guided within the hollow void.

4. The apparatus of claim 1, wherein the first and second periodic structures are dielectric structures each having a periodic array of channels having different first and second void-filling fractions.

5. An apparatus comprising:
a band-gap light guidance region having a hollow void within which light is guided by a band-gap effect;
a microstructure disposed adjacent to the hollow void for enhancing light guidance; and
an active gain material disposed in an interface area between the hollow void and the microstructure for providing active gain to the light guidance, wherein the microstructure comprises a Bragg photonic band-gap fiber having alternating layers of refractive index for defining a band-gap region.

6. An apparatus comprising:
a band-gap light guidance region having a hollow void within which light is guided by a band-gap effect;
a microstructure disposed adjacent to the hollow void for enhancing light guidance; and
an active gain material disposed in an interface area between the hollow void and the microstructure for providing active gain to the light guidance, wherein the microstructure comprises an active periodic two dimensional dielectric structure of a first periodicity having a plane of periodicity, comprising an active element and configured to produce a photonic band-gap having a first band-gap region; and
the active periodic two dimensional dielectric structure optically pumped by an excitation source to provide optical gain at the wavelength of the first band-gap region in a direction perpendicular to the plane of periodicity.

7. The apparatus of claim 6, further comprising: a second periodic structure of a second periodicity adjacent in the plane to the active periodic structure for confinement of optical energy by a second band-gap.

8. The apparatus of claim 7, wherein the hollow void provides a defect within the active periodic structure to create at least one photonic defect state within the first band-gap region, such that amplification is produced at a frequency corresponding to the defect state.

9. The apparatus of claim 8, wherein the active element belongs to a group including an active gas, a rare earth element or a transitional metal element for disposing in a signal and pump overlap portion of the first periodic structure.

10. The apparatus of claim 9, wherein a surface defined by a signal and pump overlap portion of the periodic structure is disposed within the optical field of at least one photonic defect state and the defect supports at least one surface mode that overlaps at least one active element in the signal and pump overlap portion of the structure.

11. The apparatus of claim 10, wherein the active periodic structure having a first pitch ($\Lambda$) between band-gap-lattice apertures having a dimension $r_{cl}$ a defect having a dimension $R_d$ providing single mode and including a gas, the active periodic structure having a fractional volume of voids not less than 40%, the ratio of defect dimension to pitch has a range from about 1.12 to 1.20 for configuring the band-gap region to provide the overlap for the surface mode and the core mode with the optical gain region and suppressing the surface mode at the signal wavelength.

12. The apparatus of claim 10, wherein the active periodic structure having a first pitch ($\Lambda$) between band-gap-lattice apertures and a ratio of defect dimension ($R_d$) to pitch in a range from about 1.12 to 1.20 for configuring the band-gap region to provide the overlap for the surface mode and the core mode with the optical gain region and suppressing the surface mode at the signal wavelength.

13. The apparatus of claim 9, wherein the active periodic structure having a first void-filling fraction, and the second periodic structure having a second void-filling fraction, the second periodic structure being positioned adjacent to the active periodic structure.

14. The apparatus of claim 13, wherein the first and second periodic structures are dielectric structures each having a periodic array of channels having the same first and second void-filling fractions configured to form a single band-gap that contains both a signal wavelength and a pump wavelength such that a signal mode and a pump mode are guided within the hollow void.

15. The apparatus of claim 13, wherein the first and second periodic structures are dielectric structures each having a periodic array of channels having different first and second void-filling fractions.

16. The apparatus of claim 13, wherein the first void-filling fraction is smaller than the second void-filling fraction for confinement of the optical pump radiation using total internal reflection.

17. An apparatus comprising:
a band-gap light guidance region having a hollow void within which light is guided by a band-gap effect;
a microstructure disposed adjacent to the hollow void for enhancing light guidance; and
an active gain material disposed in an interface area between the hollow void and the microstructure for providing active gain to the light guidance, wherein the interface area forms a portion of the microstructure such that the microstructure area including the interface area is about 10-300% greater than the interface area.

18. An apparatus comprising:
a band-gap light guidance region having a hollow void within which light is guided by a band-gap effect;
a microstructure disposed adjacent to the hollow void for enhancing light guidance; and
an active gain material disposed in an interface area between the hollow void and the microstructure for providing active gain to the light guidance, wherein the microstructure has a plurality of apertures to provide a void-filling fraction within a range of about 0.4 to 1.0, wherein the apparatus further comprises an active photonic crystal band-gap fiber for providing optical gain for at least one optical mode that spectrally overlaps at least a portion of at least one photonic band-gap, the photonic crystal band-gap fiber having a pitch and pores having a volume fraction in a range about 44% to 98% of the photonic band-gap crystal and further having the hollow void providing a defect having a boundary that encloses a plane cross section and a length dimension perpendicular to the plane cross section, the defect boundary being characterized by a numerical value wherein the numerical value is selected so that the wavelength of the localized mode produced by the defect propagates in the wavelength range of the photonic band-gap, and the ratio of the numerical value of said defect to the pitch is selected to interact with the excitation of surface modes within the photonic band-gap.

19. A fiber laser/amplifier comprising:
an active source having a pump light for providing an output power;
a double-clad optically active photonic band-gap fiber (PBGF) having a first end for receiving the pump light and a second end for outputting a laser signal, the double-clad optically active PBGF including
a defect core for supporting close to a single-mode transmission of the laser signal, the core having a cross-sectional core area;
an inner cladding disposed adjacent to the core having a first band-gap;
one or more optically excitable dopants having a transition requiring a high level of inversion at a desired signal wavelength of the laser signal disposed in an interface portion of the inner cladding adjacent to the defect core, the interface portion configured sufficiently small to match a laser mode field geometry of the pump light to allow the inner cladding to optically deliver the pump light to the core and the one or more of optically excitable dopants at a high pump power density and to allow a sufficiently large overlap between dopants in the inner cladding interface portion and core modes of the defect core and the pump light, such that the high pump power density and the large overlap between dopants and the pump light provide the required level of inversion for lasing with a low power threshold and high efficiency; and an
outer cladding disposed adjacent in the plane to the inner cladding having a second band-gap with a second void-filling fraction different than the first void-filling fraction of the inner cladding for confining the pump light.

20. The apparatus of claim 19, wherein the fiber laser/amplifier comprises a narrow-linewidth amplifier for reducing SBS effects.

21. The apparatus of claim 19, further comprising a pair of feedback reflectors for the fiber laser/amplifier to lase as a laser.

22. An apparatus comprising:
a band-gap light guidance region having a hollow void within which light is guided by a band-gap effect;
a microstructure disposed adjacent to the hollow void for enhancing light guidance; and
an active gain material disposed in an interface area between the hollow void and the microstructure for providing active gain to the light guidance, wherein the microstructure comprises a photonic crystal waveguide and the interface area comprises a signal and pump overlap portion doped with active materials that spatially overlap guided modes of the waveguide, the photonic crystal waveguide comprising a dielectric confinement region surrounding a waveguide axis, the confinement region comprising a photonic crystal having at least one photonic band-gap, such that during operation the confinement region guides electro-magnetic (EM) radiation in a first range of frequencies to propagate along the waveguide axis as a first guided mode for propagating pump energy along the waveguide axis and such that the active gain material disposed in the signal and pump overlap portion of the dielectric confinement absorbs the pump energy and stores the pump energy as a potential energy source for stimulation by a signal energy for emitting EM energy in a second guided mode at a second frequency in a second range of frequencies for spatially overlapping with the first guided mode such that the surface defined by an interface between the at least one photonic band-gap region and the hollow void that supports at least one surface mode propagating at that interface overlaps the signal and pump overlap and a state associated with the hollow void.

23. The apparatus of claim 22, further comprising an excitation source, applied to the interface area having a radius in a range greater than the radius of the hollow void by a factor of 1.0-3.0, for causing the interface area to emit electromagnetic radiation, wherein the excitation source is configured to produce optical gain for the second guided mode at the second frequency.

24. An apparatus comprising:
a band-gap light guidance region having a hollow void within which light is guided by a band-gap effect;
a microstructure disposed adjacent to the hollow void for enhancing light guidance; and
an active gain material disposed in an interface area between the hollow void and the microstructure for providing active gain to the light guidance, wherein the microstructure comprises an active periodic two dimensional dielectric structure of a first periodicity having a plane of periodicity and comprising an active element and configured to produce a photonic band-gap having a first band-gap region, the active periodic two dimensional dielectric structure being structured and arranged to be optically pumped by an excitation source to provide optical gain at the wavelength of the first band-gap region in a direction perpendicular to the plane of periodicity, the apparatus further comprising a second periodic structure of a second periodicity adjacent in the plane to the active periodic structure for confinement of optical energy by a second band-gap, wherein the hollow void provides a defect within the active periodic structure to create at least one photonic defect state within the first band-gap region, such that amplification is produced at a frequency corresponding to the defect state, and wherein the active element belongs to a group including an active gas, a rare earth element or a transitional metal element for disposing in a signal and pump overlap portion of the first periodic structure, and wherein a surface defined by a signal and pump overlap portion of the periodic structure is disposed within the optical field of at least one photonic defect state and the defect supports at least one surface mode that overlaps at least one active element in the signal and pump overlap portion of the structure.

25. The apparatus of claim 24, wherein the active periodic structure having a first pitch ($\Lambda$) between band-gap-lattice apertures having a dimension $r_{cl}$ a defect having a dimension $R_d$ providing single mode and including a gas, the active periodic structure having a fractional volume of voids not less than 40%, the ratio of defect dimension to pitch has a range from about 1.12 to 1.20 for configuring the band-gap region to provide the overlap for the surface mode and the core mode with the optical gain region and suppressing the surface mode at the signal wavelength.

26. The apparatus of claim 24, wherein the active periodic structure having a first pitch ($\Lambda$) between band-gap-lattice apertures and a ratio of defect dimension ($R_d$) to pitch in a range from about 1.12 to 1.20 for configuring the band-gap region to provide the overlap for the surface mode and the core mode with the optical gain region and suppressing the surface mode at the signal wavelength.

* * * * *